United States Patent
Takeuchi et al.

[11] Patent Number: 6,096,456
[45] Date of Patent: Aug. 1, 2000

[54] FILM FOR A SEPARATOR OF ELECTROCHEMICAL APPARATUS, AND PRODUCTION METHOD AND USE THEREOF

[75] Inventors: Masataka Takeuchi; Shuichi Naijo; Takashi Ohkubo, all of Chiba, Japan

[73] Assignee: Showa Denko K.K., Tokyo, Japan

[21] Appl. No.: 08/934,902

[22] Filed: Sep. 22, 1997

Related U.S. Application Data

[63] Continuation-in-part of application No. 08/723,251, Sep. 30, 1996, abandoned.
[60] Provisional application No. 60/014,568, Apr. 1, 1996.

[30] Foreign Application Priority Data

Sep. 29, 1995 [JP] Japan ................................. 7-253957

[51] Int. Cl.$^7$ .................................................. H01M 2/16
[52] U.S. Cl. ........................ 429/249; 429/252; 429/320
[58] Field of Search .................................. 429/249, 252, 429/320

[56] References Cited

U.S. PATENT DOCUMENTS

| | | |
|---|---|---|
| 4,357,401 | 11/1982 | Andre et al. . |
| 4,699,857 | 10/1987 | Giovannoni et al. ................. 429/204 |
| 4,830,939 | 5/1989 | Lee et al. . |
| 4,994,335 | 2/1991 | Kamei et al. ............................ 429/154 |
| 5,217,827 | 6/1993 | Fauteux et al. . |
| 5,225,298 | 7/1993 | Nakayama et al. .................... 429/252 |
| 5,358,620 | 10/1994 | Golovin et al. . |
| 5,389,463 | 2/1995 | Chang et al. ............................ 429/142 |
| 5,597,661 | 1/1997 | Takeuchi et al. . |
| 5,665,490 | 9/1997 | Takeuchi et al. ...................... 429/192 |

FOREIGN PATENT DOCUMENTS

| | | |
|---|---|---|
| 63-055811 | 3/1988 | Japan . |
| 3089457 | 4/1991 | Japan . |
| WO 94/24715 | 10/1994 | WIPO .......................... H01M 6/18 |
| WO 94/29884 | 12/1994 | WIPO ........................... H01B 1/12 |

*Primary Examiner*—Maria Nuzzolillo
*Assistant Examiner*—Tracy Dove
*Attorney, Agent, or Firm*—Sughrue, Mion, Zinn, Macpeak & Seas, PLLC

[57] ABSTRACT

This invention provides a film comprising a cross-linked polymer having an oxyalkylene group or a cross-linked polymer having an oxyalkylene group through a urethane bond, as a constituent component, a production method of the film, and an electrochemical apparatus using the film as a separator.

The film for separator of an electrochemical apparatus can be easily and uniformly processed, can include an electrolytic solution, exhibits good film thickness and ensures excellent safety and reliability. The electrochemical apparatus is free of leakage of the solution.

27 Claims, 2 Drawing Sheets

FILM FOR A SEPARATOR OF ELECTROCHEMICAL APPARATUS, AND PRODUCTION METHOD AND USE THEREOF

CROSS REFERENCE TO RELATED APPLICATION

This is a continuation-in-part of: (1) Application Ser. No 08/723,251, filed on Sep. 30, 1996, now abandoned which in turn claims benefit of Provisional Application Ser. No. 60/014,568, filed Apr. 1, 1996; And (2) International Application PCT/JP96/02826, filed Sep. 27, 1996.

FIELD OF THE INVENTION

The present invention relates to a separator of an electrochemical apparatus comprising a cross-linked polymer having an oxyalkylene group as a constituent component, and a production method and use thereof. More specifically, the present invention relates to a battery and a capacitor each having the above-described separator.

BACKGROUND OF THE INVENTION

Lithium (Li) primary batteries or Li secondary batteries as one of electrochemical apparatuses are being torrentially mounted into compact portable equipment due to its property of high energy density, and growing abruptly. As a separator which is an important constituent factor of the battery, a porous film such as a polyolefin nonwoven fabric and a polyolefin-made microporous film is being use. The separator is demanded to have functions of separating a positive electrode from a negative electrode to prevent occurrence of electrical short-circuit and also allowing movement of ions present between a positive electrode and a negative electrode in an electrolytic solution.

Further, the separator is preferably thin as much as possible if it satisfies the above-described functions, so that the battery as a whole can have a large energy density.

In order to achieve the above-described functions, a porous thin film is currently used as a separator. However, the production and processing costs of the film are high and as a result, the film comes expensive. Further, the film has no capability to carry the electrolytic solution and therefore, leakage of solution from the battery to outside the parts or elution of electrode substance is readily caused, giving rise to problems in view of long-term reliability and safety of the battery.

In recent years, a so-called solid polymer electrolyte comprising a composite of a polyethylene oxide-base polymer and a Li salt is being taken notice of. For example, as the solid polymer electrolyte, *Br. Polym. J.*, Vol. 319, page 137 (1975) describes a composite of a polyethylene oxide and an inorganic alkali metal salt, which is reported to exhibit ion conductivity. Further, it is reported that a comb-structure polymer having introduced into the side chain thereof an oligooxyethylene elevates thermal motility of the oxyethylene chain bearing ion conductivity and thereby the ion conductivity is improved. For example, *J. Phys. Chem.*, Vol. 89, page 987 (1984) describes a polymethacrylic acid having added to the side chain thereof an oligooxyethylene and compounded with an alkali metal salt. Further, *J. Am. Chem. Soc.*, Vol. 106, page 6,854 (1984) describes a polyphosphazene compounded with an alkali metal salt. These polymers themselves form a complex with a Li salt as an electrolyte to cause ion conduction due to the thermal motion of the polymer chain. Accordingly, holes for passing the electrolytic solution as in a currently used separator are not required. However, these polymer materials are insufficient in both film strength and ion conductivity and cannot include a large amount of electrolyte.

On the other hand, a solid polymer electrolyte impregnated with an electrolytic solution comprising a metal salt and an aprotic solvent in the continuous network of the polyethylene oxide (U.S. Pat. No. 4,792,504) is proposed. This reveals that the oxyethylene chain can be impregnated not only with a Li salt but also with an aprotic solvent, whereby a uniform ion conductor free of holes is provided. However, this polymer electrolyte can be hardly processed into a strong film and has difficulties in absorbing the electrolytic solution afterward, which is also far from such thinking. Further, due to the structure of the cross-linking agent, the polymer electrolyte has failed in achieving satisfactory ion conductivity.

Furthermore, in recent years, for use in the memory backup power source, an electrical double-layer capacitor where a carbon material having a large specific surface area, such as activated carbon and carbon black, is used as polarizable electrodes and an ion conductive solution is held therebetween, is increasing. For example, *Kino Zairyo* (*Functional Materials*), page 33 (February, 1989) describes a capacitor using a carbon-base polarizable electrode and an organic electrolytic solution, and 173rd *Electrochemical Society Meeting*, Atlanta, Ga., No. 18 (May, 1988) describes an electrical double-layer capacitor using an aqueous sulfuric acid solution. Further, Japanese Unexamined Patent Publication (kokai) No. 63-244570 discloses a capacitor using $Rb_2Cu_3I_3Cl_7$ having a high electrical conductivity as an inorganic solid electrolyte.

However, electrical double-layer capacitors using a current electrolyte solution are bound to problems upon a long-term use or in reliability because the solution readily leaks outside the capacitor at an abnormal time such as use for a long period of time or application of high voltage. On the other hand, electrical double-layer capacitors using a conventional inorganic ion conductive substance have problems that the decomposition voltage of the ion conductive substance is low and the output voltage is low.

Japanese Unexamined Patent Publication (kokai) No. 4-253771 proposes to use a polyphosphazene-base polymer as an ion conductive substance for batteries or electrical double-layer capacitors. When a solid ion conductive substance mainly comprising the above-described polymer is used, there are provided advantages such that the output voltage is relatively high as compared with that obtained using an inorganic ion conductive substance, formation into various shapes is available and sealing is easy.

However, the ion conductivity of this solid polymer electrolyte is from $10^{-4}$ to $10^{-6}$ S/cm and insufficient and the takeout current is disadvantageously small. The ion conductivity may be elevated by adding a plasticizer to the solid polymer electrolyte, which, however, results in impartation of fluidity As a result thereof, the electrolyte can be difficult to be handled as a complete solid, is poor in the film strength or the film-forming property, readily causes short circuit when applied to an electrical double-layer capacitor or a battery, and generates problems in view of sealing similarly to the case of a liquid-type ion conductive substance. On the other hand, when a solid electrolyte is assembled together with a polarizable electrode into a capacitor, a problem arises such that they are difficult to be uniformly compounded into a carbon material having a large specific surface area because a solid and a solid are mixed.

The solid polymer electrolyte layer in an electrochemical apparatus such as a battery and a capacitor undertakes only the transfer of ions and when it is made thin as much as possible, the volume of the apparatus as a whole can be reduced and the energy density of the battery, and capacitor, etc. can be increased. Also, when the solid polymer electrolyte layer is made thin, the electric resistance of a battery or a capacitor can be lowered, the takeout current and the charging current can be increased, and the power density of a battery can be improved. Furthermore, corrosion of ions, particularly alkali metal ions, does not easily occur and the cycle life can be prolonged. Accordingly, a solid polymer electrolyte film improved in the film strength as much as possible, capable of reduction in the film thickness and having a high ion conductivity has been demanded.

Also, in the case where a solid polymer electrolyte is disposed between the electrodes of an electrochemical apparatus such as a battery or electrical double-layer capacitor, it is possible to maintain the distance between the electrodes by disposing a frame-like spacer between the opposing electrodes. However, it is not easy to process the electrolyte and spacer and to fabricate the apparatus. In a thin apparatus or wound type apparatus, for example, a problem is encountered in the dimensional stability in thickness of the solid polymer electrolyte layer occupying the space between the electrodes other than that occupied by the spacer, depending on the type thereof, which makes it difficult to maintain the thickness, or distance between the electrodes, precisely at a constant value. As a consequence, and/or because of its insufficient mechanical strength, the inter-electrode distance fluctuates from a place to place in the apparatus, so that short circuiting can occur readily and problems can occur in the stability of characteristics and the like of the apparatus.

OBJECT OF THE INVENTION

An object of the present invention is to provide a novel film for separator and a separator of an electrochemical apparatus, which can be processed easily, has uniform film thickness and the like, can include a large amount of electrolyte or electrolytic solution, exhibits good film strength and high ion conductivity after inclusion of the electrolyte or electrolytic solution, is excellent in the safety and the reliability, and comprises a solid polymer electrolyte as a constituent component capable of exhibiting good ion conductivity even at room temperature or a temperature lower than that, and a production method thereof.

Another object of the present invention is to provide an electrochemical apparatus free from leakage of solution comprising a combination of an ion conductive separator film or a separator and a solid polymer electrolyte, and a production method thereof.

A still another object of the present invention is to provide a battery using the above-described film for separator or the separator, which can be easily reduced in the thickness, can work at a high capacity and a high current, and is excellent in the reliability, and a production method thereof.

A further object of the present invention is to provide a secondary battery having a good cyclability and having a separator comprising the above-described film for separator or the separator, and a production method thereof.

A still further object of the present invention is to provide an electrical double-layer capacitor using the ion conductive film for a separator or the separator of the present invention, which is high in the output voltage, large in the takeout current and excellent in the processability and the reliability, and a method thereof.

SUMMARY OF THE INVENTION

As a result of extensive investigations taking account of the above-described problems, the present inventors have found that the film comprising, as a constituent component, a cross-linked polymer containing an oxyalkylene group is very suitable as the objective separator and accomplished the present invention. Also, the present inventors have found that by using, as a constituent component, a polymer obtained from a polymerizable compound having a urethane bond and containing an oxyalkylene group, a film for separator and a separator which are satisfactory in the film strength, excellent in the processability and large in the inclusion amount of the electrolyte or the electrolytic solution, can be obtained.

Also, the present inventors have found that by compounding the polymer with a support, a film for a separator and a separator can be obtained, which have a good film strength and a uniform film thickness, and that by using such a film or separator, the above-described problems of the mechanical strength, stability of characteristics and the like of the film for a separator, the separator and the electrochemical apparatus can be solved.

Further, the present inventors have found that by using the above-described separator, an excellent electrochemical apparatus free from leakage of the solution can be obtained. For example, when the separator is used in a battery, the battery produced can be improved in the long-term reliability and safety.

Furthermore, the present inventors have found that by using the separator of the present invention, an electrical double-layer capacitor, particularly a whole solid type electrical double-layer capacitor, which is high in the output voltage, large in the takeout current and excellent in the processability and the reliability, can be obtained.

The above-described objects of the present invention can be achieved by the following structures or methods:

[1] A film for separator of an electrochemical apparatus comprising, as a constituent component, a cross-linked polymer having an oxyalkylene group.

Or a film for separator of an electrochemical apparatus comprising, as a constituent component, an acryloyl-base cross-linked or an alkyl-substituted acryloyl-base cross-linked polymer having an oxyalkylene group.

[2] A film for separator of an electrochemical apparatus comprising, as a constituent component, a cross-linked polymer having a urethane bond and an oxyalkylene group.

Or a film for separator of an electrochemical apparatus comprising, as a constituent component, an acryloyl-base cross-linked or an alkyl-substituted acryloyl-base cross-linked polymer having a urethane bond and an oxyalkylene group.

[3] A film for separator of an electrochemical apparatus as described in item [1] or [2], wherein the polymer is a polymer of an acryloyl-base or methacryloyl-base compound having a structure containing a unit represented by formula (1) and/or a copolymer comprising the compound as a copolymer component:

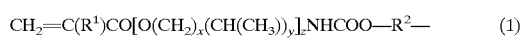

$$CH_2=C(R^1)CO[O(CH_2)_x(CH(CH_3))_y]_zNHCOO-R^2- \qquad (1)$$

[wherein $R^1$ represents hydrogen or an alkyl group; $R^2$ represents a divalent organic group containing an oxyalkylene group and the organic group may be linear, branched or cyclic, or may contain one or more elements other than carbon, hydrogen and oxygen; x and y each represents 0 or an integer of from 1 to 5 and z represents a numerical value of from 1 to 10, provided that when x=0 and y=0, z=0; and the moiety ($CH_2$) and the moiety ($CH(CH_3)$) may be configured irregularly; provided that when the unit represented by formula (1) is present in plurality in the same molecule, the $R^1$ or $R^2$ groups or the values represented by x, y or z are independent from each other and need not be the same].

[4] A film for separator of an electrochemical apparatus as described in item [1] or [2], wherein the polymer is a polymer of an acryloyl-base or methacryloyl-base compound having a structure containing a unit represented by formula (2) and/or a copolymer comprising the compound as a copolymer component:

$$CH_2=C(R^1)CO[O(CH_2)_x(CH(CH_3))_y]_zNHCOO(R^3O)_n— \qquad (2)$$

[wherein $R^1$ represents hydrogen or an alkyl group, $R^3$ represents —$(CH_2)_2$— or —$CH(CH_3)CH_2$—, n represents an integer of 1 or greater, and x, y and z each has the same meaning as defined in formula (1)].

[5] A film for separator of an electrochemical apparatus as described in items [1] to [4], wherein the film contains an electrolyte and/or a solvent.

[6] A film for separator of an electrochemical apparatus as described in item [5], wherein at least one of the electrolyte is an alkali metal salt, a quaternary ammonium salt or a quaternary phosphonium salt.

[7] A film for separator of an electrochemical apparatus as described in item [5], wherein the solvent is a carbonate-base compound.

[8] A film for separator of an electrochemical apparatus as described in items [1] to [7], wherein the film is a film compounded to a support.

[9] A film for separator of an electrochemical apparatus as described in items [1] to [7], wherein the film is a film compounded to a porous support.

[10] A film for separator of an electrochemical apparatus as described in item [8] or [9], wherein the support is a granular support having a size of 0.01 to 100 $\mu$m.

[11] A film for separator of an electrochemical apparatus as described in item [8] or [9], wherein the support is an agglomerate of primary particles having a size of 0.01 to 100 $\mu$M.

[12] A film for separator of an electrochemical apparatus as described in item [10] or [11], wherein the support has a BET specific surface area of not smaller than 10 $m^2/g$.

[13] A separator of an electrochemical apparatus comprising a film described in items [8] to [12].

[14] A separator of an electrochemical apparatus as described in item [13], wherein the separator is a separator compounded with a support having a uniform size within the range of 1 to 100 $\mu$m and a uniform thickness within the range of 1 to 110 $\mu$m.

[15] A separator of an electrochemical apparatus as described in item [13] or [14], wherein the separator contains a solvent and an electrolyte in the total amount of 100 to 1,000% based on the total weight of the separator.

[16] A method for producing a film for separator of an electrochemical apparatus comprising disposing at least one acryloyl-base or methacryloyl-base compound having a structure containing a unit represented by formula (1) or a mixture obtained by adding at least one selected from an electrolyte, a solvent and other polymerizable compounds to the compound, on a support and then polymerizing the acryloyl-base or methacryloyl-base compound:

$$CH_2=C(R^1)CO[O(CH_2)_x(CH(CH_3))_y]_zNHCOO—R^2— \qquad (1)$$

[wherein each symbol has the same meaning as defined in item [3]].

[17] A method for producing a film for separator of an electrochemical apparatus comprising disposing at least one acryloyl-base or methacryloyl-base compound having a structure containing a unit represented by formula (2) or a mixture obtained by adding at least one selected from an electrolyte, a solvent and other polymerizable compounds to the compound, on a support and then polymerizing the acryloyl-base or methacryloyl-base compound:

$$CH_2=C(R^1)CO[O(CH_2)_x(CH(CH_3))_y]_zNHCOO(R^3O)_n— \qquad (2)$$

[wherein each symbol has the same meaning as defined in item [4]].

[18] A method for producing a composite film for separator of an electrochemical apparatus comprising impregnating a porous support with at least one acryloyl-base or methacryloyl-base compound having a structure containing a unit represented by formula (1) or a mixture obtained by adding at least one selected from an electrolyte, a solvent and other polymerizable compounds to the compound, and then polymerizing the acryloyl-base or methacryloyl-base compound:

$$CH_2=C(R^1)CO[O(CH_2)_x(CH(CH_3))_y]_zNHCOO—R^2— \qquad (1)$$

[wherein each symbol has the same meaning as defined in item [3]].

[19] A method for producing a composite film for separator of an electrochemical apparatus comprising disposing a mixture of at least one acryloyl-base or methacryloyl-base compound having a structure containing a unit represented by the formula (1) described above and a granular support or a mixture of the at least one above-mentioned compound, the granular support, and at least one selected from an electrolyte, a solvent and other polymerizable compounds, on another support and then polymerizing the acryloyl-base or methacryloyl-base compound.

[20] A method for producing a separator of an electrochemical apparatus comprising disposing a mixture of at least one acryloyl-base or methacryloyl-base compound having a structure containing a unit represented by the formula (1) described above and a granular support or a mixture of the at least one above-mentioned compound, the granular support, and at least one selected from an electrolyte, a solvent and other polymerizable compounds, on an electrode and then polymerizing the acryloyl-base or methacryloyl-base compound.

[21] A method for producing a composite film for separator of an electrochemical apparatus comprising impregnating a porous support with at least one acryloyl-base or methacryloyl-base compound having a structure containing a unit represented by formula (2) or a mixture obtained by adding at least one selected from an electrolyte, a solvent and other polymerizable compounds to the compound, and then polymerizing the acryloyl-base or methacryloyl-base compound:

$$CH_2=C(R^1)CO[O(CH_2)_x(CH(CH_3))_y]_zNHCOO(R^3O)_n— \qquad (2)$$

[wherein each symbol has the same meaning as defined in item [4]].

[22] A method for producing a composite film for separator of an electrochemical apparatus comprising disposing a mixture of at least one acryloyl-base or methacryloyl-base compound having a structure containing a unit represented by the formula (2) described above and a granular support or a mixture of the at least one above-mentioned compound, the granular support, and at least one selected from an electrolyte, a solvent and other polymerizable compounds, on another support and then polymerizing the acryloyl-base or methacryloyl-base compound.

[23] A method for producing a separator of an electrochemical apparatus comprising disposing a mixture of at least one acryloyl-base or methacryloyl-base compound having a structure containing a unit represented by the formula (2) described above and a granular support or a mixture of the at least one above-mentioned compound, the granular support, and at least one selected from an electrolyte, a solvent and other polymerizable compounds, on an electrode and then polymerizing the acryloyl-base or methacryloyl-base compound.

[24] A battery using the film described in items [1] to [12] as a separator.

[25] A battery as described in item [24], wherein the negative electrode of the battery comprises an electrode containing lithium, a lithium alloy or a material capable of occluding and releasing lithium ions.

[26] A method for producing a battery comprising a step of laminating a positive electrode, a separator comprising the film described in items [1] to [12] and a negative electrode in any order to form a positive electrode/separator/negative electrode laminate with the separator being interposed between the positive electrode and the negative electrode as a battery-constituting structure, a step of filling the battery-constituting structure having the above-described construction with a polymerizable monomer-containing material containing, as essential constituent components, at least one electrolyte and at least one acryloyl-base or methacryloyl-base compound having a structure containing a unit represented by formula (1) or (2):

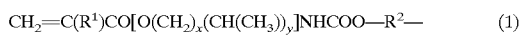

[wherein each symbol has the same meaning as defined in item [3]]; or

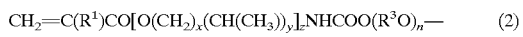

[wherein each symbol has the same meaning as defined in item [4]], and a step of polymerizing the polymerizable monomer-containing material.

[27] A method for producing a battery comprising a step of forming a positive electrode/separator/negative electrode laminate with the separator being interposed between the positive electrode and the negative electrode as a battery-constituting structure using a positive electrode/separator laminate and/or a negative electrode/separator laminate obtained by previously laminating a separator comprising a film described in items [1] to [12] on at least one of the positive electrode and the negative electrode, and a step of filling the battery-constituting structure having the above-described construction with a liquid material containing at least one electrolyte as an essential constituent component.

[28] A method for producing a battery comprising a step of forming a positive electrode/separator/negative electrode laminate with the separator being interposed between the positive electrode and the negative electrode as a battery-constituting structure using a positive electrode/separator laminate and/or a negative electrode/separator laminate obtained by previously laminating a separator comprising a film described in items [1] to [12] on at least one of the positive electrode and the negative electrode, a step of filling the battery-constituting structure having the above-described construction with a polymerizable monomer-containing material containing, as essential constituent components, at least one acryloyl-base or methacryloyl-base compound having a structure containing a unit represented by formula (1) or (2):

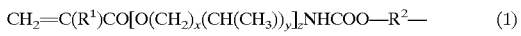

[wherein each symbol has the same meaning as defined in item [3]]; or

[wherein each symbol has the same meaning as defined in item [4]], and a step of polymerizing the polymerizable monomer-containing material.

[29] A method for producing a battery having a separator comprising the film described in items [1] to [12], which comprises a step of forming a positive electrode/porous support/negative electrode laminate with the porous support being interposed between the positive electrode and the negative electrode as a battery-constituting structure using a positive electrode/porous support laminate and/or a negative electrode/porous support laminate obtained by laminating a porous support on at least one of the positive electrode and the negative electrode, a step of filling the battery-constituting structure having the above-described construction with a polymerizable monomer-containing material containing, as essential constituent components, at least one electrolyte and at least one acryloyl-base or methacryloyl-base compound having a structure containing a unit represented by formula (1) or (2):

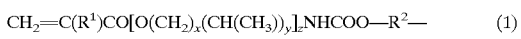

[wherein each symbol has the same meaning as defined in item [3]]; or

[wherein each symbol has the same meaning as defined in item [4]], and a step of polymerizing the polymerizable monomer-containing material.

[30] A method for producing a battery comprising a step of previously impregnating and/or coating at least one of the positive electrode and the negative electrode with a polymerizable monomer-containing material containing at least one acryloyl-base or methacryloyl-base compound having a structure containing a unit represented by formula (1) or (2):

[wherein each symbol has the same meaning as defined in item [3]]; or

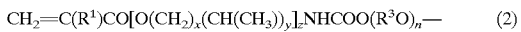

[wherein each symbol has the same meaning as defined in item 4] as a constituent component, a step of forming a positive electrode/separator/negative electrode laminate with the separator being interposed between the positive electrode and the negative electrode as a battery-constituting structure using a positive electrode, a negative electrode and a separator comprising a film described in items [1] to [12], and a step of polymerizing the polymerizable monomer-containing material.

[31] A method for producing a battery described in item [30], wherein the polymerizable monomer-containing material is a polymerizable monomer-containing material containing, as essential constituent components, at least one electrolyte and at least one acryloyl-base or methacryloyl-base compound having a structure containing a unit represented by formula (1) or (2):

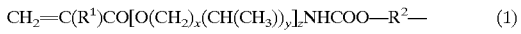

[wherein each symbol has the same meaning as defined in item [3]]; or

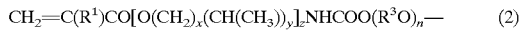  (2)

[wherein each symbol has the same meaning as defined in item [4]].

[32] An electrical double-layer capacitor using the film described in items [1] to [12] as a separator.

[33] A method for producing an electrical double-layer capacitor comprising a step of laminating two sheets of polarizable electrodes and a separator comprising the film described in items [1] to [12] in any order to form an electrode/separator/electrode laminate with the separator being interposed between two sheets of polarizable electrodes as a capacitor-constituting structure, and a step of filling the capacitor-constituting structure having the above-described construction with a liquid material containing at least one electrolyte as an essential constituent component.

[34] A method for producing an electric double-layer capacitor comprising a step of laminating two sheets of polarizable electrodes and a separator comprising the film described in items [1] to [12] in any order to form an electrode/separator/electrode laminate with the separator being interposed between two sheets of polarizable electrodes as a capacitor-constituting structure, a step of filling the capacitor-constituting structure having the above-described construction with a polymerizable monomer-containing material containing, as essential constituent components, at least one electrolyte and at least one acryloyl-base or methacryloyl-base compound having a structure containing a unit represented by formula (1) or (2):

  (1)

[wherein each symbol has the same meaning as defined in item [3]]; or

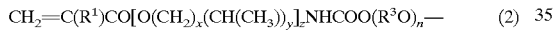  (2)

[wherein each symbol has the same meaning as defined in item [4]], and a step of polymerizing the polymerizable monomer-containing material.

[35] A method for producing an electrical double-layer capacitor having a separator comprising the film described in items [1] to [12] comprising a step of laminating two sheets of polarizable electrodes and a porous support in any order to form an electrode/porous support/electrode laminate with the support being interposed between two sheets of polarizable electrodes as a capacitor-constituting structure, a step of filling the capacitor-constituting structure having the above-described construction with a polymerizable monomer-containing material containing, as essential constituent components, at least one electrolyte and at least one acryloyl-base or methacryloyl-base compound containing a unit represented by formula (1) or (2):

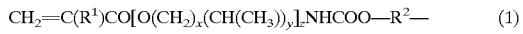  (1)

[wherein each symbol has the same meaning as defined in item [3]]; or

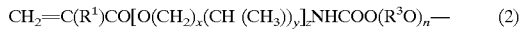  (2)

[wherein each symbol has the same meaning as defined in item [4]], and a step of polymerizing the polymerizable monomer-containing material.

[36] A method for producing an electrical double-layer capacitor comprising a step of previously impregnating and/or coating at least one of two polarizable electrodes with a polymerizable monomer-containing material containing, as an essential component, an acryloyl-base or methacryloyl-base-compound having a structure containing a unit represented by formula (1) or (2):

  (1)

[wherein each symbol has the same meaning as defined in item [3]]; or

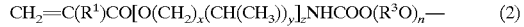  (2)

[wherein each symbol has the same meaning as defined in item [4]], a step of forming an electrode/separator/electrode laminate with the separator being interposed between two sheets of polarizable electrodes as an electrical double-layer capacitor-constituting structure using two sheets of polarizable electrodes and a separator comprising the film described in items [1] to [12], and a step of polymerizing the polymerizable monomer-containing material.

[37] A method for producing an electrical double-layer capacitor as described in item [36], wherein the polymerizable monomer containing material is a polymerizable monomer-containing material containing, as essential constituent components, at least one electrolyte and at least one acryloyl-base or methacryloyl-base compound having a structure containing a unit represented by formula (1) or (2):

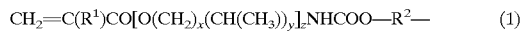  (1)

(wherein each symbol has the same meaning as defined in item [3]]; or

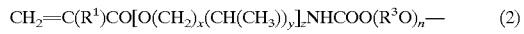  (2)

[wherein each symbol has the same meaning as defined in item [4]].

DETAILED DESCRIPTION OF THE INVENTION

Figure 1:
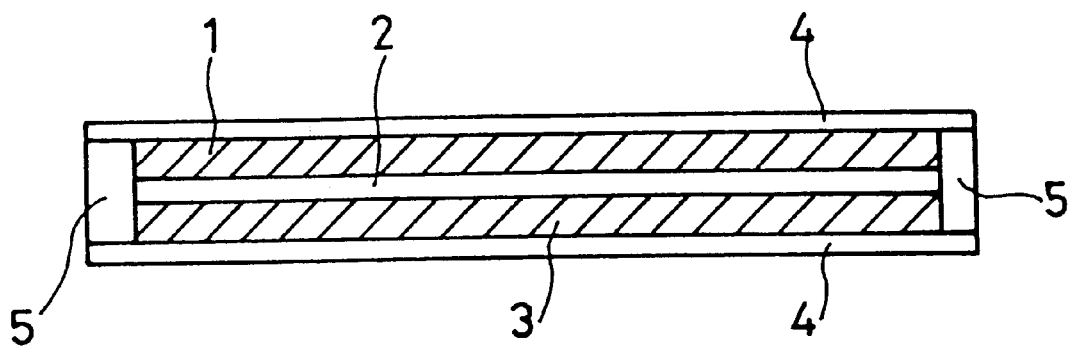
FIG. 1 is a schematic cross section of a battery produced in the Example.

Hereinafter, the present invention will be described in more detail.

The term "oxyalkylene" as used in the present invention includes an oligooxyalkylene and a polyoxyalkylene containing at least one oxyalkylene. Further, the term "Li battery" as used herein includes a Li ion battery.

The polymer as a constituent component of the film for separator of the present invention is a cross-linked polymer having an oxyalkylene structure. In particular, a cross-linked polymer having a urethane bond and an oxyalkylene group is preferred because of easy processability and good film strength. Further, a polymer of a polymerizable compound having a structure containing a unit represented by the above-mentioned formula (1) or (2) (hereinafter, particularly the polymerizable compound having the above-described structure may be simply referred to as a "monomer") is more preferred.

The compound having a structure containing a unit represented by formula (1) or (2) can be obtained by reacting $CH_2=C(R^1)CO[O(CH_2)_x(CH(CH_3))_y]_zNCO$ with an oligoalkylene glycol or with a polyhydric alcohol resulting from addition condensation of an oligoalkylene glycol to a polyhydric alcohol (in formula, $R^1$, x, y and z each is the same as defined in formula (1)).

More specifically, the monomer having one ethylenically unsaturated group can be easily obtained by reacting, for example, a methacryloyl isocyanate-base compound (hereinafter simply referred to as "MI group") or an acryloyl isocyanate-base compound (hereinafter simply referred to as "AI group") with monoalkyl oligoalkylene glycol at a molar ratio of 1:1.

The monomer having two ethylenically unsaturated groups can be easily obtained by reacting, for example, an MI group and/or an AI group with oligoalkylene glycol at a molar ratio of 2:1.

The monomer having three ethylenically unsaturated groups may be easily obtained by reacting, for example, an MI group and/or an AI group with triol resulting from addition polymerization of alkylene oxide to a trihydric alcohol such as glycerin, at a molar ratio of 3:1.

The monomer having four ethylenically unsaturated groups can be easily obtained by reacting, for example, an MI group and/or an AI group with tetraol resulting from addition polymerization of alkylene oxide to a tetrahydric alcohol such as pentaerythritol, at a molar ratio of 4:1.

The monomer having five ethylenically unsaturated groups can be easily obtained by reacting, for example, an MI group and/or an AI group with pentaol resulting from addition polymerization of alkylene oxide to a-D-glucopyranose, at a molar ratio of 5:1.

The monomer having six ethylenically unsaturated groups can be easily obtained by reacting, for example, an MI group and/or an AI group with hexaol resulting from addition polymerization of alkylene oxide to mannitol or sorbitol, at a molar ratio of 6:1.

Similarly, as the polymerizable compound for use in the production of a polymer as a constituent component of the film for separator of the present invention, the compound having a structure containing a unit represented by formula (1) or (2) is preferably used. A polymer obtained by polymerizing only a compound containing only one unit represented by formula (1) or (2) has no cross-linked structure and due to insufficiency in the film strength, formation into a thin film is accompanied by a large risk of generation of electrical short-circuit. Accordingly, compounds containing only one unit represented by formula (1) or (2) are preferably not used individually. In other words, such a compound must be copolymerized with a polymerizable compound having two or more units represented by formula (1) or (2) or with other cross-linking polymerizable compound to form a cross-linked structure. In this case, the proportion of the compound containing only one unit represented by formula (1) or (2) is, based on the amount of all polymerizable compounds, from 0.5 to 99.5 wt %, preferably from 1 to 80 wt %, more preferably from 5 to 60 wt %. However, when a compound containing two or more units represented by formula (1) or (2) is contained as a copolymer component, the compound containing only one unit may be nil. Accordingly, the proportion of the compound containing only one unit may be described to be from 0 to 99.5 wt %, based on the amount of all polymerizable compounds.

In producing a film for separator of the present invention, a cross-linking polymerizable compound is essentially used in the polymerization or copolymerization. When the cross-linking polymerizable compound used is a cross-linking polymerizable compound containing two or more units represented by formula (1) or (2), the proportion thereof accounting for the amount of all polymerizable compounds is preferably from 0.5 to 100 wt %, more preferably from 30 to 100 wt %, still more preferably from 50 to 100 wt %.

When the cross-linking polymerizable compound used is a polymerizable compound other than the cross-linking polymerizable compound containing two or more units represented by formula (1) or (2), the proportion thereof accounting for the amount of all polymerizable compounds is preferably from 0.5 to 100 wt %, more preferably from 0.5 to 80 wt %, still more preferably from 0.5 to 50 wt %.

Taking account of the strength of the thin film, the monomers for the polymer used as a constituent component of the film for separator of the present invention particularly preferably include a monomer having three or more units represented by formula (1) or (2) in one molecule of the monomer.

Among the compounds having a structure containing a unit represented by formula (1), the compound having a structure containing a unit represented by formula (2) is more preferred because the oxyalkylene content in the polymer obtained can be increased and the thin film formed therefrom can have an intensified film strength, thereby achieving a large inclusion amount of electrolytic solution or electrolyte.

The polymer preferred as a constituent component of the film for separator of the present invention can be obtained by polymerizing at least one compound having a structure containing a unit(s) represented by formula (1) and/or formula (2) or polymerizing the compound as a copolymer component.

The polymer for use in the film for separator of the present invention may be a homopolymer of a compound having a structure containing a unit(s) represented by formula (1) and/or formula (2), a copolymer of two or more compounds belonging to the category, or a copolymer of at least one compound belonging to the category with other polymerizable compound.

The other polymerizable compound for use in the polymerization with a polymerizable compound (monomer) having a structure containing a unit(s) represented by formula (1) and/or formula (2) is not particularly restricted as long as the compound is copolymerizable with the compound having a structure containing a unit(s) represented by formula (1) and/or formula (2), and may be appropriately selected depending upon the purpose from known monofunctional polymerizable compounds and polyfunctional polymerizable compounds. Examples of the copolymerizable monofunctional polymerizable compound include acrylic (or methacrylic) esters having an oxyalkylene chain such as methacrylic acid w-methyl oligooxyethyl ester, alkyl acrylates (or methacrylates) such as methyl methacrylate and n-butyl acrylate, acryl (or methacryl) amide-base compounds such as acrylamide, methacrylamide, N,N-dimethylacrylamide, N,N-dimethylmethacrylamide, acryloylmorpholine, methacryloylmorpholine and N-N-dimethylaminopropylacryl(or methacryl)amide, styrene-base compounds such as styrene and a-methylstyrene, N-vinylamide-base compounds such as N-vinylacetamide and N-vinylformamide, and alkyl vinyl ethers such as ethyl vinyl ether. Among these, preferred are urethane acrylate(or methacrylate) having an oxyalkylene chain, acrylic (or methacrylic) esters having an oxyalkylene chain and acryl (or methacryl) amide-base compounds.

Examples of the cross-linking polyfunctional polymerizable compound capable of copolymerization include diacrylates or dimethacrylates of polyalkylene glycol having a molecular weight of 10,000 or less (e.g., oligoethylene oxide, polyethylene oxide, oligopropylene oxide, polypropylene oxide, ethylene oxide-propylene oxide copolymer), diacrylates or dimethacrylates of a linear, branched or cyclic alkylene glycol having from 2 to 20 carbon atoms (e.g., ethylene glycol, propylene glycol, trimethylene glycol, 1,4-butanediol, 1,5-pentanediol, 1,6-hexanediol, 1,7-heptanediol, 1,8-octanediol, 1,9-nonanediol, 1.10-decanediol, cyclohexane-1,4-diol), polyfunctional acrylate or methacrylate compounds (e.g., trimethylolpropane triacrylate (TMPTA), trimethylolpropane trimethacrylate (TMPTM), pentaerythritol triacrylate (PETA), pentaerythritol trimethacrylate (PETM), dipentaerythritol hexaacrylate (DPHA), dipentaerythritol hexamethacrylate (DPHM)) where two or more OH groups in the linear, branched or cyclic polyhydric alcohol having three or more OH groups such as glycerin, trimethylolpropane, pentaerythritol, sorbitol, glucose and mannitol, are replaced by acryloyloxy or methacryloyloxy groups, polyfunctional acrylate compounds having a molecular weight of 20,000 or less where two or more OH groups in the above-described polyhydric alcohol are replaced by acryloyloxy-oligo(or poly)ethyleneoxy (or propyleneoxy) groups, polyfunctional methacrylate compounds having a molecular weight of 20,000 or less where two or more OH groups in the above-described polyhydric alcohol are replaced by methacryloyloxy-oligo(or poly)ethyleneoxy (or propyleneoxy) groups, aromatic urethane acrylate (or methacrylate) compounds such as a reaction product of tolylenediisocyante with a hydroxyalkyl acrylate (or methacrylate) (e.g., hydroxyethyl acrylate), aliphatic urethane acrylate (or methacrylate) compounds such as a reaction product of an aliphatic diisocyante such as hexamethylene diisocyante with a hydroxyalkyl acrylate (or methacrylate) (e.g., hydroxyethyl methacrylate), divinyl compounds such as divinylbenzene, divinyl ether and divinyl sulfone, and diallyl compounds such as diallyl phthalate and diallyl carbonate.

Among these polyfunctional polymerizable compounds, in view of ion conductivity, strength and formability of the film for separator of the present invention or of the film for use in the present invention, preferred are those having an acryloyl group or a methacryloyl group as a polymerizable functional group and also having a plurality of oxyalkylene structure units, more preferred are those further having a urethane bond.

In producing a film for separator or an electrochemical apparatus using the film according to the present invention, the polymerizable compound (monomer) having a structure containing a unit(s) represented by formula (1) or (2) can be polymerized or copolymerized by a usual method using the polymerizability of the acryloyl group or the methcaryloyl group in the monomer. More specifically, the monomer alone or a mixture of the monomer with the above-described other polymerizable compound capable of copolymerization may be subjected to radical polymerization, cation polymerization or anion polymerization using a radical polymerization catalyst such as azobisisobutyronitrile or benzoyl peroxide, a cation polymerization catalyst such as a protonic acid (e.g., $CF_3COOH$) or a Lewis acid (e.g., $BF_3$, $AlCl_3$), or an anion polymerization catalyst such as butyl lithium, sodium naphthalene or lithium alkoxide. When the total content of the polymerizable compound having a structure containing a unit(s) represented by formula (1) or (2) and a urethane acrylate (or methacrylate) having an oxyalkylene chain as one of the other polymerizable compounds exceeds 20 wt % based on the weight of all polymerizable compounds, the polymerization can be performed under a condition approximate to an oxygen-free condition only by elevating the temperature to 70° C. or higher.

The polymer for use in the film for separator of the present invention may be a mixture or a composite of a polymer obtained from at least one polymerizable compound having a structure containing a unit(s) represented by formula (1) or (2) and/or a copolymer containing the compound as a copolymer component, with other polymer. For example, a mixture or a composite of a polymer obtained from at least one polymerizable compound having a structure containing a unit(s) represented by formula (1) or (2) and/or a copolymer containing the compound as a copolymer component, with any other polymer such as thermoplastic resin or thermosetting resin, may be used in the film for separator of the present invention as long as the other polymer is electrochemically stable as a separator constituent component of an electrochemical apparatus and does not impair functions of the separator obtained nor adversely affect working or capability of the electrochemical apparatus such as ion conductivity, including polyethylene, polypropylene, polyethylene oxide, polypropylene oxide, ethylene oxide-propylene oxide copolymer, polyacrylonitrile, polybutadiene, polymethacrylic (or acrylic) esters, polystyrene, polyphosphazenes, polysiloxane, polyvinylidene fluoride, polyvinylidene chloride, polyvinyl ethyl ether and polysilane.

In the case of a copolymer, the amount of the structure unit derived from the polymerizable compound having a structure containing a unit(s) represented by formula (1) or (2) contained in the copolymer may vary depending upon the kind of the other copolymer component or the polymer mixture or composite components, however, when urethane acrylate (or methacrylate) having an oxyalkylene chain is not contained as the other polymerizable compound, it is preferably, based on the total amount of the copolymer, 20 wt % or more, more preferably 50 wt % or more by taking account of the ion conductivity and the film strength upon use in an electrochemical apparatus such as a battery or an electrical double-layer capacitor. When urethane acrylate (or methacrylate) having an oxyalkylene chain is contained as a copolymer component, satisfactory ion conductivity and film strength may be obtained even if the content of the structure unit derived from the polymerizable compound having a structure containing a unit(s) represented by formula (1) or (2) contained is reduced according to the amount of the urethane acrylate, however, the content is necessarily at least 0.5 wt % or more, preferably 2 wt % or more, more preferably 5 wt % or more.

The amount of the copolymer comprising the polymerizable compound having a structure containing a unit(s) represented by formula (1) or (2) as a copolymer component is preferably 50 wt % or more based on the total amount of the polymers used in the film for separator. When the amount of the structure unit derived from the polymerizable compound having a structure containing a unit(s) represented by formula (1) or (2) falls within the above-described range, the polymer can achieve a satisfactory film strength and when used as a battery, the battery can have a high ion conductivity.

In the repeating monomer unit of the polymer used in the film for separator of the present invention, the number of oxygen atoms contained in the oxyalkylene chain derived from the unit(s) represented by formula (1) or (2) is preferably from 1 to 1,000, more preferably from 2 to 500, still more preferably from 5 to 150.

The molecular weight of the polymerizable compound having a structure containing a unit(s) represented by formula (1) or (2) is preferably approximately from 150 to 60,000, more preferably approximately from 180 to 30,000, still more preferably approximately from 270 to 9,000. Among the polymerizable compounds, the compounds having a high molecular weight is highly viscous or a solid and the polymers obtained therefrom have a low cross-linking density, accordingly, these compounds may be restricted upon use depending upon the purpose, however, in such a case, the problem may be overcome by using, among the above-described compounds, a compound having a lower molecular weight in combination, whereby the compounds having a high molecular weight may be also preferably used.

The monomer in the (co)polymer for use in the film for separator of the present invention, when in the unit represented by formula (1) or (2), (a) x is 0 or 1, y is 0 or 1 and z is 0 or 1 (provided that when x=0 and y=0, z=0), can be produced using a corresponding isocyanate compound as a raw material, namely, $CH_2=C(R^1)CO[O(CH_2)_x(CH(CH_3))_y]_zNCO$. This compound is highly reactive and the reaction with various oxyalkylene compounds can be easily performed. The monomer obtained after the reaction is liquid, low in the viscosity and advantageous in that the reaction in a solvent system is facilitated.

The monomer as an essential component of the (co) polymer for use in the film for separator of the present invention is reduced in the polymerizability when (b) x=2 to 5, y=0 and z=1 to 10, (c) x=1 to 5, y=1 to 5 (random or alternate configuration) and z=1 to 10, or (d) x=0, y=1 to 5 and z=1 to 10, and as a result, the storage stability is increased and the handleability as a monomer is good.

In particular, in the case of (c) or (d), when many side-chain methyl groups are present, the dielectric constant may be lowered, however, polymers having a high molecular weight is not increased in the melting point and the viscosity as compared with polymers having few side-chain methyl groups and depending upon the use end, hence, they are very advantageous polymers. Accordingly, by using the properties of the above-described monomers and by combining appropriate monomers or combining the monomer with other polymerizable compound or other polymer, a film for separator suitable for the objective use can be obtained.

In producing a film for separator of the present invention, a solvent or an electrolyte for use in the electrolytic solution of the battery or other polymerizable compound may be previously added to the above-described monomer followed by polymerization, thereby previously impregnating a solvent or an electrolyte in the film for separator of the present invention, which is one preferred embodiment of the present invention. By doing so, impregnation of the electrolytic solution after assembling of a battery as performed at present is not necessarily required, which is advantageous to simplification of the assembling process of a battery or to improvement in the yield.

The solvent or the electrolyte may be any as long as the electrolyte can be used in the electrolytic solution for use in batteries.

Examples of the solvent include oligoethers such as triethylene glycol dimethyl ether and tetraethylene glycol dimethyl ether, carbonates such as ethylene carbonate, propylene carbonate, dimethyl carbonate and diethyl carbonate, aromatic nitriles such as benzonitrile and tolunitrile, nitrogen-containing solvents such as dimethylformamide, N-methylpyrrolidone and N-vinylpyrrolidone, sulfur-containing solvents such as dimethyl sulfoxide and sulfolane, and phosphoric esters. Among these, preferred are oligoethers and carbonates, more preferred are carbonates.

Examples of the electrolyte include alkali metal salts such as $Li\ CF_3SO_3$, $LiN(CF_3SO_2)_2$, $LiPF_6$, $LiClO_4$, $LiI$, $LiBF_4$, $LiSCN$, $LiAsF_6$, $NaCF_3SO_3$, $NaPF_6$, $NaClO_4$, $NaI$, $NaBF_4$, $NaAsF_6$, $KCF_3SO_3$, $KPF_6$ and $KI$, quaternary ammonium salts such as $(CH_3)_4NBF_4$, and quaternary phosphonium salts such as $(CH_3)_4PBF_4$.

The film for separator of the present invention is preferably in the form of a thin film in view of the use thereof. In order to obtain the thin film, according to one preferred embodiment of the present invention, the monomer-containing material is shaped into a film followed by polymerization or subjected to pressure molding polymerization.

More specifically, a polymerizable monomer-containing material containing at least one polymerizable compound (monomer) having a structure containing a unit(s) represented by formula (1) or (2), if desired, mixed with at least one electrolyte such as an alkali metal salt, a quaternary ammonium salt or a quaternary phosphonium salt and further, if desired, added by and mixed with other polymerizable compound and/or a plasticizer and/or a solvent, is polymerized by, for example, heating and/or irradiation of electromagnetic waves such as visible light or ultraviolet rays in the presence or absence of the above-described catalyst after or during molding into a film according to extrusion molding, calender molding or press molding to obtain a film polymer material, whereby the freedom in terms of processability is expanded and the merit in application is great.

When a solvent is used, although it depends upon the kind of the monomer, the presence or absence of the other polymerizable compound or the presence or absence of a polymerization catalyst, any solvent may be used if the solvent does not inhibit the polymerization. Examples thereof include tetrahydrofuran, acetonitrile, toluene, dimethyl carbonate, ethanol and a mixture of two or more thereof.

The polymerization temperature may vary depending upon the kind of the monomer or the presence or absence of the other polymerizable compound, however, any temperature may suffice as long as the polymerization takes place and the polymerization temperature is usually from 0 to 200° C. When the polymerization is performed by the irradiation of magnetic waves, although it may depends upon the kind of the monomer or the presence or absence of the other polymerizable compound, the polymerization may be performed, for example, using an initiator such as benzyl methyl ketal or benzophenone and irradiating ultraviolet light or g rays of several mW or more.

The separator of the present invention may be a composite film with any other support. By combining with such a support, the film can be further increased in the strength or controlled in the thickness with high precision. However, depending upon the kind or the amount of the support compounded, reduction in the conductivity or deterioration in the stability may be caused after absorption of the electrolytic solution and therefore, a suitable support must be selected. When the compounding is achieved such that there can exist a suitable amount of porosity that allows an electrolytic solution or ion species to enter into the composite film, the electrolytic solution or ion species fills the pore cavities due to absorption of the electrolytic solution, with the result that the composite film has dispersed and maintains therein the electrolytic solution or ion species, thus increasing the ion conductivity or ion mobility without deteriorating the strength of film or separator. The support to be compounded may have a shape suited for the purpose, such as plate, lattice, sintered body, grain or film. Among these, porous films are used preferably in the film for a separator and the separator of the present invention from the viewpoint of ion conductivity and the like. In the case where a support is to be used when it is desired to use a thin film separator of an electrochemical apparatus for some reason or another, such as for reducing the occupation ratio of the separator in the entire electrochemical apparatus as much as possible, it is particularly preferred to use a support in the form of a film or granules of a uniform size. In such a case, a composite film or separator which has excellent suppleness and flexibility and good precision in thickness by compounding with a film-form or granular support and use of such a film or separator results in an electrochemical apparatus having improved performance and stability. Examples of the film-form support include porous ion-conductive or non-electroconductive film-form supports including porous polyolefin sheet such as polypropylene-made nonwoven fabric and net polyolefin sheet (e.g., polyethylene-made net), polyolefin-made microporous film such as Cellguard (trade name, manufactured by Celanese Corp.), and nylon nonwoven fabric; and the like. Among these, porous polyolefin sheet is particularly preferred in view of stability and the like.

The shape and the size of the hole of the film-form support are not particularly limited and may suffice as long as they are a shape and a size capable of impregnation or filling with a polymerizable monomer-containing material or an electrolyte-containing solution.

Examples of the hole shape include lattice or net space of a lattice or net support and shapes usually expressed as porous, such as recession, bag or tunnel space as provided on the surface or inside of the support.

In the film-form support having the above-described hole size and shape, as long as the functions as a film for separator such as strength and processability of the separator film formed are not impaired and as long as the ion conductivity of the separator containing the electrolyte is suitable for the use purpose, the hole size is preferably larger. The size is, in terms of sieve's size, preferably 500 mesh (ASTM) or larger, more preferably 300 mesh or larger.

The hole ratio of the film-form support may be approximately from 10 to 90%, but as long as the strength is satisfied, the hole ratio is preferably larger. The hole ratio is preferably from 20 to 90%, and in view of an optimal balance between the strength and the ion conductivity, the hole ratio is more preferably from 30 to 80%.

The compounding method is not particularly restricted and a preferred example thereof is a method of impregnating, for example, a porous film support with at least one polymerizable compound (monomer) having a structure containing a unit(s) represented by formula (1) or (2), or with a mixture obtained by adding to the compound at least one electrolyte and/or solvent and, if desired, other polymerizable compound, and then polymerizing the monomer, where the monomer and the support can be uniformly compounded and the film thickness can be easily controlled.

As the granular support, there can be cited, for example, various non-electroconductive or ion-conductive polymer fillers such as polystyrene/divinylbenzene copolymer gel, polyethylene, polypropylene and the like and ion-conductive or non-electroconductive ceramics fillers such as a-, b- or g-alumina and silica.

From the viewpoint of increasing the strength of the composite film, the amount of electrolytic solution and the like, a particularly preferred support is one which has an agglomerate structure having pores within the structure, such as porous structure, or secondary particles derived by agglomerating primary particles, fibrous structure, network or three dimensional network structure. Specific examples of the support having such a structure include silica particles such as Aerosil (trade name for a product by Nippon Aerosil Co., Ltd.), alumina particles, various fibers and agglomerate structures thereof, with alumina particles being particularly preferred in view of stability, ease of compounding and the like.

Representative examples of the electrochemical apparatus of the present invention include a battery and an electrical double-layer capacitor. When a battery of the present invention is produced using a film for separator of the present invention, the film may be previously impregnated with an appropriate amount of electrolytic solution during the preparation thereof to include the electrolyte before use or the film may be impregnated with an electrolytic solution after the preparation thereof to include the electrolyte before use. The film of the present invention hardly undergoes leakage of the electrolytic solution and has good ion conductivity as a film.

Further, the above-described ion conductive separator of the present invention may be combined with a positive electrode and a negative electrode each compounded with a solid polymer electrolyte, thereby obtaining a battery such as a solid Li secondary battery free of leakage of the solution, high in the reliability and capable of free shaping.

Further, use of supports having a size as uniform as possible such as rod or spherical support (herein generally referred to as "granular material") used as a spacer in liquid crystal display devices gives rise to an increased precision in thickness of a composite film or a separator comprising the composite film and therefore the support having such a uniform size can be used particularly preferably as a film for a separator or a separator in the present invention. In order to obtain a composite film or separator which has such a uniformity and high precision in thickness, although it is of course preferred to use as the support a film- or net-form support, such as nonwoven fabric, as described above, use of such granular materials having an appropriate size, for example, supports of various shapes such as spherical, oval, cubic, rectangular parallelepiped, cylindrical or rod, thread ball and the like achieves uniform films or separators which are excellent in strength, suppleness, flexibility and ion conductivity in less compounding amounts.

The film- or net-form support, which constitutes a continuous layer in a composite film or separator, in the direction parallel to a surface of the film or separator, may have a thickness in the direction of thickness of the film or separator that is of any dimension as far as it is not greater than the thickness of the film or separator and may be selected appropriately depending on the purpose. Further, the support which does not constitute the continuous layer and is other than the film- or net-form support (i.e., the above-described granular material) is of a size not limited particularly as far as it can be mixed with a polymerizable monomer-containing material and/or an electrolyte containing solution and the resulting composite film or separator has functions such as strength, processability and shape which are not harmed and further the ion conductivity of the separator containing an electrolyte conforms to the use purpose. For example, when the target to be used is a film or separator comprised by a thin film, the size of the granular material is preferably 0.01 to 100 μm, more preferably 0.01 to 30 μm. In the present invention, by the "size" of a support is meant the size of the support which exists in a composite film or separator in the direction perpendicular to a surface of the film or separator, i.e., the size of the support in the direction of the thickness of the film or separator. By the term "size" is meant, for example, particle diameter in the case where the granular material, which is a support having a shape which constitutes a discontinuous layer, is spherical, a height (cross-sectional diameter) when the particle is placed such that its longitudinal axis lies' horizontally in the case where the granular material is cylinder-, rod- or prism-form, or maximum height in the case where the granular material is in the form of a hexahedron, polyhedron or thread ball. For example, in the case of a cylindrical granular material obtained by cutting an alkali-less glass of 9 μm in diameter to 50 μm-long sections (usually referred to as "fiber spacer"), the height is 9 μm.

As the uniform size granular material support compounded in order to increase precision in thickness of the composite film or separator comprising the composite film, any type of organic or inorganic materials may be used as far as they give no adverse influence on the electrochemical characteristics, stability, safety and other properties of the target electrochemical apparatus. Granular materials used as a spacer in liquid crystal display devices, for example, are examples of a preferred support, and specific examples thereof include inorganic-based granular materials such as silica, alumina, alkali-less glass and the like, organic-based granular materials such as melamine resin, urea resin, acrylic resin, polystyrene/divinylbenzene copolymer gel, polyethylene, polypropylene and the like. Among such granular materials, spherical, cylindrical or rod-form materials are particularly preferred in order for the granular materials to be uniformly dispersed in the solid electrolyte layer between the electrodes.

According to the present invention, there can be obtained separators for an electrochemical apparatus, having a uniform thickness within the range of 1 to 110 μm. Herein, by the term "uniform thickness" is meant a specific thickness within the range of 1 to 110 μm with a fluctuation of the thickness being within ±10%, for example, a film thickness of 10 μm with a fluctuation of film thickness of within ±1.0 μm.

In the present invention, as the granular support to be compounded for obtaining a separator of an electrochemical, apparatus, having a uniform thickness within the range of 1 to 110 μm, there can be used a support having a uniform size within the range of 1 to 100 μm. Here, in term "uniform size," the term "size" has the same meaning as described above and the term "uniform" means that the size of the granular support (for example, particle diameter in the case of a spherical support) has the following fluctuation.

That is, the size is a specific value within the range of 1 to 100 μm and its fluctuation is within ±10%, for example, a fluctuation within ±1.0 μm in the case of the granular support having a size of 10 μm. In the present invention, the granular support to be compounded in order to obtain a separator for electrochemical apparatus, having a thickness of 1 to 110 μm may be of any type as far as the size is within the range of 1 to 100 μm and its fluctuation is within the above-described range, preferably within ±7%.

As the separator for the electrochemical apparatus of the present invention, those having a thickness within the range of 1 to 110 μm are preferred from the viewpoint of the characteristics of electrochemical apparatus, with those having a thickness of 1 to 50 μm being more preferred. Particularly in thin type secondary batteries, electrical double-layer capacitors and other devices, those having a thickness within the range of 1 to 30 μm are particularly preferred.

In the present invention, in the case where it is intended to increase the ion conductivity and ion mobility of the composite film having compounded the granular support by increasing the content of the electrolyte or ion species therein, it is preferred that the granular support to be used have a specific surface area as large as possible, preferably 10 $m^2/g$ or more as measured by BET method and more preferably 50 $m^2/g$ in order to further increase the ion conductivity and ion mobility.

As the negative electroactive material for use in the battery of the present invention, the material having a low oxidation-reduction potential such as an alkali metal, an alkali metal alloy or a carbon material, in which an alkali metal ion functions as a carrier as will be described below, is preferably used. By using such an electroactive material, the battery obtained can have a high voltage and a high capacity. Accordingly, the electrolyte for use in the battery using the above-described negative electrode and using an alkali metal ion as a carrier needs be an alkali metal salt.

Examples of the alkali metal salt include $LiCF_3SO_3$, $LiN(CF_3SO_2)_2$, $LiPF_6$, $LiClO_4$, LiI, $LiBF_4$, LiSCN, $LiAsF_6$, $NaCF_3SO_3$, $NaPF_6$, $NaClO_4$, NaI, $NaBF_4$, $NaAsF_6$, $KCF_3SO_3$, $KPF_6$ and KI. Among these, most preferred are those using lithium or a lithium alloy as an alkali metal because of high voltage and high capacity and capability of reduction in the film thickness. In the case of a carbon material negative electrode, not only alkali metal ions but also quaternary ammonium salts, quaternary phosphonium salt, transition metal salts and various protonic acids may be used.

The battery of the present invention preferably has a construction such that an electroactive material (negative electroactive material) having a low oxidation-reduction potential such as an alkali metal, an alkali metal alloy, a carbon material or an electroconductive polymer, in which an alkali metal ion functions as a carrier, is used as the negative electrode, because a battery of high voltage and high capacity can be obtained. Among these electroactive materials, preferred are a lithium metal and lithium alloys such as a lithium/aluminum alloy, a lithium/lead alloy and a lithium/antimony alloy because of their lowest oxidation-reduction potential. The carbon material is also preferred in the point that when it occludes Li ions, a low oxidation-reduction potential is provided and moreover, the material is stable and safe. Examples of the carbon material capable of occluding and releasing Li ions include natural graphite, artificial graphite, pyrolytic carbon synthesized by a vapor phase process and a graphitized product thereof, petroleum coke, coal coke, pitch-base carbon, polyacene and furalenes such as $C_{60}$ and $C_{70}$.

The battery of the present invention preferably has a construction such that an electroactive material (positive electroactive material) having a high oxidation-reduction potential such as a metal oxide, a metal sulfide, an electroconductive polymer or a carbon material is used as the positive electrode, because a battery of high voltage and high capacity can be obtained. Among these electroactive materials, preferred in view of high filling density and high volume capacity density are metal oxides such as cobalt oxide, manganese oxide, vanadium oxide, nickel oxide and molybdenum oxide, and metal sulfides such as molybdenum sulfide, titanium sulfide and vanadium sulfide, and particularly preferred in view of high capacity and high voltage are manganese oxide, nickel oxide and cobalt oxide.

The production method of these metal oxides and metal sulfides is not particularly restricted and for example, they may be produced by general electrolytic process or heating process as described in *Denkikagaku* (*Electrochemistry*), Vol. 22, page 574 (1954). When they are used in a lithium battery as an electroactive material, at the production of the battery, the material is preferably used in the state such that a Li element is inserted (compounded) into a metal oxide or a metal sulfide, for example, in the form of $Li_xCoO_2$ or $Li_xMnO_2$. The insertion method of the Li element is not particularly limited and for example, a method of electrochemically inserting Li ions or a method of mixing a salt such as $Li_2CO_3$ with a metal oxide and subjecting the mixture to heat treatment described in U.S. Pat. No. 4,357,215 may be used.

In view of flexibility and easy formability into a thin film, electroconductive polymers are preferred as the positive electroactive material. Examples of the electroconductive polymer include polyaniline, polyacetylene and a derivative thereof, polyparaphenylene and a derivative thereof, polypyrrolylene and a derivative thereof, polythienylene and a derivative thereof, polypyridinediyl and a derivative thereof, polyisothianaphthenylene and a derivative thereof, polyfurylene and a derivative thereof, polyselenophene and a derivative thereof, and polyarylenevinylene and a derivative thereof such as polyparaphenylenevinylene, polythienylenevinylene, polyfurylenevinylene, polynaphthenylenevinylene, polyselenophenevinylene and polypyridinediylvinylene. Among these, preferred are polymers of an aniline derivative soluble in an organic solvent. The above-described electroconductive polymers for use as an electroactive material in a battery or in an electrode can be produced according to a chemical or electrochemical method which will be described later, or other known method.

Examples of the carbon material include natural graphite, artificial graphite, vapor phase process graphite, petroleum coke, coal coke, graphite fluoride, pitch-base carbon and polyacene.

Also, the carbon material for use as an electroactive material in the battery or electrode of the present invention may be a commercially available product or may be produced by a known method.

The organic solvent-soluble aniline-base polymer is advantageous in that when used as a positive electroactive material in the electrode or the battery of the present invention, the formation can be performed by coating the solution. In particular, the organic solvent-soluble aniline-base polymer is very advantageous in producing thin film batteries. Examples of the aniline-base polymer include polyaniline, poly-o-toluidine, poly-m-toluidine, poly-o-anisidine, poly-m-anisidine, polyxylidines, poly-2,5-dimethoxyaniline, poly-2,6-dimethoxyaniline, poly-2,5-diethoxyaniline, poly-2,6-diethoxyaniline, poly-o-ethoxyaniline, poly-m-ethoxyaniline and copolymers thereof, however, the aniline-base polymer is not restricted to these and polymers having a repeating unit derived from an aniline derivative may be used. The introduction amount of side chains in the organic solvent-soluble aniline-base polymer is preferably larger in view of solubility, however, as the introduction amount increases, the capacity per weight as a positive electrode disadvantageously decreases. Accordingly, preferred examples of the aniline-base polymer are polyaniline, poly-o-toluidine, poly-m-toluidine, poly-o-anisidine, poly-m-anisidine and polyxylidines.

The polymerization method for the aniline-base polymer for use in the present invention is not particularly limited, however, for example, a method of electrochemically or chemically oxidation-polymerizing an aniline derivative such as aniline or o-anisidine, as described in *Journal of Chemical Society, Chemical Communication*, page 1784 (1987), is usually used.

The electrochemical oxidation polymerization is performed by anodic oxidation at a current density of approximately from 0.01 to 50 $mA/cm^2$ and an electrolysis voltage of from 0.1 to 30 V according to any of a constant current process, a constant voltage process and other methods. The pH of the electrolytic solution is not particularly restricted, however, the pH is preferably 3 or less, more preferably 2 or less. Specific examples of the acid for use in the control of pH include strong acids such as HCl, $HBF_4$, $CF_3COOH$, $H_2SO_4$, $HNO_3$ and paratoluenesulfonic acid, however, the acid is not limited thereto.

In case of chemical oxidation polymerization, for example, an aniline derivative may be oxidation polymerized in an acidic solution with an oxidizing agent such as peroxide or persulfate. The acid used here may be the same as those used in electrochemical oxidation polymerization, however, the acid is by no means limited thereto.

The molecular weight of the aniline-base polymer used in the above-described method in the present invention is not particularly restricted, however, it is usually preferably 2,000 or more.

The aniline-base polymer obtained by the above-described method generally contains in many cases anions in the polymerization solution as a dopant and this is disadvantageous in view of solubility and capacity per weight. Accordingly, it is preferably undoped from the anions and further converted into a reducing type, before forming an electrode, for example, by a film formation method. The undoping method is not particularly restricted, however, in general, a method of treating the polymer with a base such as aqueous ammonia or sodium hydroxide is used. The reduction method is also not particularly restricted and a commonly known chemical or electrochemical reduction may be used. For example, with respect to a chemical reduction method, the reduction can be easily performed by dipping or stirring the aniline-base polymer treated with a base in a hydrazine or phenylhydrazine solution at room temperature.

The thus-obtained undoped or reduced aniline-base polymer is soluble in various organic solvents and can be mixed as a solution with a polymerizable monomer-containing material containing at least one polymerizable compound having a unit(s) represented by the afore-mentioned formula (1) and/or (2). The thus-prepared material may be used for film formation on various supports, for example, on an electrode, for example, by a coating method, or may be formed into other shapes, to obtain an electrode.

The solvent in which the aniline-base polymer dissolves depends upon the kind of the substituent on the benzene ring and is not particularly restricted, however, examples thereof include pyrrolidones such as N-methylpyrrolidone, amides such dimethylformamide, and polar solvents such as m-cresol and dimethylpropyleneurea.

Examples of the method for producing the battery of the present invention are described in detail below.

An example of the production method of a battery of the present invention is a method for producing a battery comprising a step of laminating a positive electrode, a separator comprising the film described in the aforementioned items [1] to [12] and a negative electrode in any order to form a positive electrode/separator/negative electrode laminate with the separator being interposed between the positive electrode and the negative electrode as a battery-constituting structure, a step of filling the battery-constituting structure having the above-described construction with a polymerizable monomer-containing material containing, as essential constituent components, at least one electrolyte and at least one acryloyl-base or methacryloyl-base compound having a structure containing a unit represented by formula (1) or (2), and a step of polymerizing the polymerizable monomer-containing material.

Another example of the production method of a battery of the present invention is a method for producing a battery comprising a step of forming a positive electrode/separator/negative electrode laminate with the separator being interposed between the positive electrode and the negative electrode as a battery-constituting structure using a positive electrode/separator laminate and/or a negative electrode/separator laminate obtained by previously laminating a separator comprising a film described in items [1] to [12] on at least one of the positive electrode and the negative electrode, and a step of filling the battery-constituting structure having the above-described construction with a liquid material containing at least one electrolyte as an essential constituent component.

Another example of the production method of a battery of the present invention is a method for producing a battery comprising a step of forming a positive electrode/separator/negative electrode laminate with the separator being interposed between the positive electrode and the negative electrode as a battery-constituting structure using a positive electrode/separator laminate and/or a negative electrode/separator laminate obtained by previously laminating a separator comprising a film described in items [1] to [12] on at least one of the positive electrode and the negative electrode, a step of filling the battery-constituting structure having the above-described construction with a polymerizable monomer-containing material containing, as essential constituent components, at least one electrolyte and at least one acryloyl-base or methacryloyl-base compound having a structure containing a unit represented by formula (1) or (2), and a step of polymerizing the polymerizable monomer-containing material.

Another example of the production method of a battery of the present invention is a method for producing a battery having a separator comprising the film described in items [1] to [12], which comprises a step of forming a positive electrode/porous support/negative electrode laminate with the porous support being interposed between the positive electrode and the negative electrode as a battery-constituting structure using a positive electrode/porous support laminate and/or a negative electrode/porous material support obtained by laminating a porous support on at least one of the positive electrode and the negative electrode, a step of filling the battery-constituting structure having the above-described construction with a polymerizable monomer-containing material containing, as essential constituent components, at least one electrolyte and at least one acryloyl-base or methacryloyl-base compound having a structure containing a unit represented by formula (1) or (2), and a step of polymerizing the polymerizable monomer-containing material.

Another example of the production method of a battery of the present invention is a method for producing a battery comprising a step of previously impregnating and/or coating at least one of the positive electrode and the negative electrode with a polymerizable monomer-containing material containing at least one acryloyl-base or methcaryloyl-base compound having a structure containing a unit represented by formula (1) or (2) or further containing at least one electrolyte, as a constituent component(s), a step of forming a positive electrode/separator/negative electrode laminate with the separator being interposed between the positive electrode and the negative electrode as a battery-constituting structure using a separator comprising a film described in items [1] to [12], and a step of polymerizing said polymerizable monomer-containing material.

In the above-described methods for producing a battery of the present invention, the term "filling the battery-constituting structure having the above-described construction" implies filling the above-described polymerizable monomer-containing material or liquid material as much as possible in the space allowable of substantial invasion by the material within the structure and covering the surface of the structure with the polymerizable monomer-containing material or liquid material. In other words, it is not limited only to the impregnation and/or coating of the inside and/or the surface of the structure with the polymerizable monomer-containing material or liquid material, but also includes the filling as much as possible of the polymerizable monomer-containing material or liquid material in the space between a structure constituting (or for constituting) an external surface and the battery-constituting structure, which is provided when the battery-constituting structure is disposed in another structure for constituting a battery, for example, in a structure constituting or for constituting the external surface of a battery such as a cylindrical battery, a coin-type battery or a sheet battery, more specifically, in the case of a cylindrical battery, inside the cylinder for constituting the cylindrical battery.

In the production method of a battery of the present invention, the positive electrode, the negative electrode or the separator of the present invention is not limited to those formed on a support, however, they are preferably used in the production of a battery after they are shaped into a sheet or a film and therefore, the positive electrode, the negative electrode or the separator of the present invention is preferably shaped into a sheet or a film on a support made of a different material.

The separator of the present invention may be formed on a support other than the current collecting body and the electrode which constitute a part of the battery-constituting structure, for example, on an organic polymer support such as polyethylene terephthalate and polytetrafluoroethylene or on an inorganic support such as glass, and after processing it into a desired shape and separating it from the support, or after separating it from the support and processing it into a desired shape, the separator may be used in the production of the battery of the present invention.

Or, the separator of the present invention may be formed on an electrode constituting a part of the battery-constituting structure as a support and if desired, after processing it into a desired shape, used in the production of the battery of the present invention.

Similarly, the electrode for use in the production of the battery of the present invention may be formed on a support other than the current collecting body and the electrode which constitute a part of the battery-constituting structure, and after processing it into a desired shape before or after separation from the support, used in the production of the battery of the present invention, or the electrode may be formed, for example, on the current collecting body and if desired, after processing it into a desired shape without separating it from the support, used in the production of the battery of the present invention.

The positive electrode or the negative electrode for use in various methods for producing a battery of the present invention may be a positive electrode/current collecting body laminate or a negative electrode/current collecting body laminate prepared by previously laminating a current collecting body for use in the construction of a battery on a positive electrode or a negative electrode. The use of such a laminate is more preferred in view of the production process.

Further, at least one of the positive electrode, the negative electrode, the porous support and the separator for use in the production method of a battery of the present invention may be previously impregnated and/or coated with a polymerizable monomer-containing material containing as an essential constituent component at least one acryloyl-base or methacryloyl-base polymerizable compound (monomer) having a structure containing a unit(s) represented by formula (1) or (2), or with a polymerizable monomer-containing material containing the monomer and at least one electrolyte as essential components. By coating at least one of the electrodes, the porous support and the separator with the above-described polymerizable monomer-containing material before use in the production of a battery, the battery produced is improved in the adhesion between positive electrode-separate-negative electrode to each other. When holes are present in the positive electrode, the negative electrode or the separator before impregnation/coating or in the case of a porous support, by previously impregnating them with the above-described polymerizable monomer-containing material, the monomer and/or the electrolyte can present even in the holes within the electrodes or the separator.

As described above, when a polymerizable monomer-containing material is previously impregnated in and/or coated on the electrodes, the porous support or the separator and after forming a battery-constituting structure, polymerized, very good adhesion can be provided between respective constituent elements of positive electrode/separator/negative electrode or current collecting body/positive electrode/separator/negative electrode/current collecting body, thereby achieving improvement in the capacity density, the current density or the cyclability of the battery produced. Thus, this is one of very preferred methods.

In the above-described production method of a battery according to the present invention, when the polymerizable monomer-containing material is impregnated in and/or coated on the battery-constituting structure, the polymerizable monomer-containing material is polymerized in a subsequent step by the same method as the polymerization method described above for obtaining a polymer from at least one polymerizable compound having a unit(s) represented by formula (1) and/or formula (2) and/or a copolymer containing the compound as a copolymer component. For example, the material is polymerized by heating and/or irradiation of electromagnetic wave or processed, after the polymerization, if desired, further through a step of sealing the unsealed portion of the battery-constituting structure with an insulating resin such as polyolefin rein or epoxy resin, thereby obtaining a battery comprising an electrode and an electrolyte in good contact with each other.

The constituent material constituting the outer surface of the battery or the above-described support may be made of a metal such as stainless steel (SUS), a resin such as polypropylene or polyimide, or a ceramic material such as electroconductive or insulating glass, however, they are not particularly limited to these materials. The shape thereof may be any of cylinder, box, sheet and others.

The current collecting body is not particularly limited and may be sufficient if it is an electronically conductive and electrochemically stable material, however, the material preferably has a specific surface area of as large as possible. Examples thereof include various metals such as stainless steel, aluminum and copper and a sintered body thereof, electron conductive polymers, carbon sheet and graphite materials.

When a laminate is formed using a porous support, the porous support described above with respect to the separator of the present invention comprising a composite film with a porous support may be used here as the porous support.

FIG. 1 shows a schematic cross section of one example of a thin film solid secondary battery as one example of the battery produced as above, wherein 1 is a positive electrode, 2 is a separator of the present invention, 3 is a negative electrode, 4 is a current collecting body and 5 is an insulating resin sealant (cured material).

In producing a roll-type battery, a positive electrode and a negative electrode are previously laminated by facing with each other through a film for separator of the present invention and then rolled, or they are laminated at the same time with rolling, to form a positive electrode/separator/negative electrode laminate, the laminate is inserted into a cylindrical battery-constituting structure, and then an electrolytic solution is injected thereinto or a polymerizable monomer-containing material comprising a polymerizable compound having a unit(s) represented by formula (1) or (2) and a plasticizer in addition to the electrolytic solution is injected and polymerized.

Figure 2:
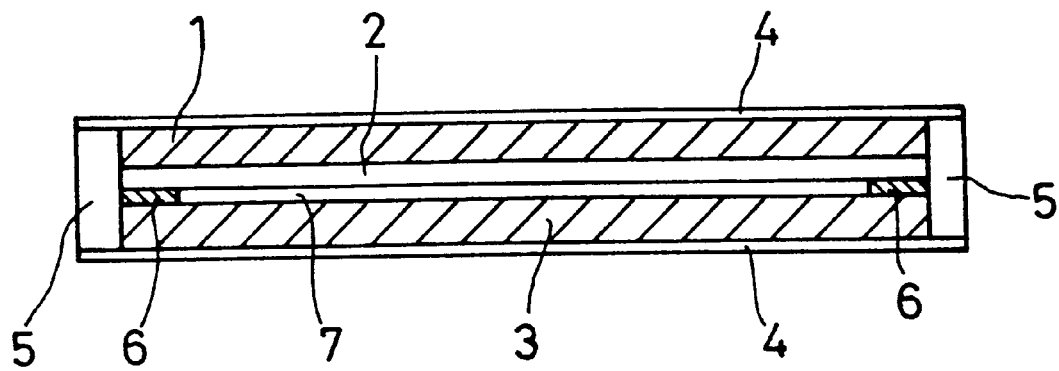
FIG. 2 is a schematic cross section of a battery produced in the Example.
Figure 3:
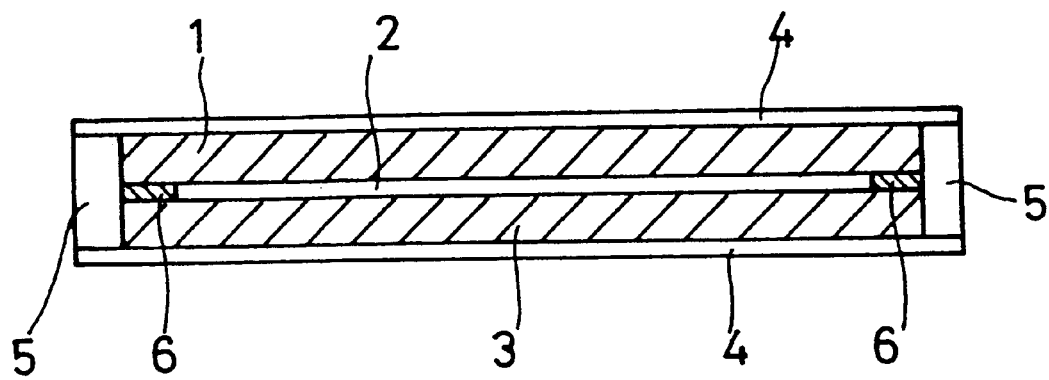
FIG. 3 is a schematic cross section of a battery produced in the Example.

In constructing a battery using a separator comprising the film of the present invention, the above-described positive electrode/separator/negative electrode laminate structure may be constructed by disposing a spacer at an optional periphery portion on the surface of at least one of the positive electrode or the negative electrode on the side facing the separator (at the edge portion of the electrode on the above-described surface), such as insulating protective sheet, protective frame or protective ring having a surface area corresponding to 40% or less, preferably 10% or less of the surface area of the above-described surface. By having such a construction, the battery of the present invention can achieve a proper and uniform distance between the positive electrode and the negative electrode, or short-circuit or deterioration of the battery capability due to concentration of the mechanical stress towards the periphery of the electrode, which may be caused at the time of assembling, can be prevented, and as a result, the reliability of the battery increases. Accordingly, the above-described construction is one preferred embodiment of the battery or of the production method of a battery, of the present invention. The spacer is not particularly restricted and may be sufficient if it is an insulating material; either organic materials or inorganic materials may be used, however, in view of stability and working property of the battery, polymer materials such as polyimide and polyolefin including polyethylene and polypropylene are preferred. FIG. 2 and FIG. 3 each shows a schematic cross section of one example of a thin film solid secondary battery as one example of the battery produced as described above. In FIG. 2 and FIG. 3, 1 is a positive electrode, 2 is a separator of the present invention, 3 is a negative electrode, 4 is a current collecting body, 5 is an insulating resin sealant (cured material), 6 is a protective frame (spacer) and 7 is a separator.

According to one particularly preferred embodiment of the method for producing a battery of the present invention, at least one of a positive electrode and a negative electrode is previously impregnated and/or coated with the above-described polymerizable monomer-containing material, a film for separator of the present invention is used as a separator, and an insulating spacer is disposed at an optional periphery portion on the surface of at least one of the positive electrode and the negative electrode on the side facing the separator to form a (current collecting body/) positive electrode (for example, with a spacer)/separator/ (spacer-disposed) negative electrode (/current collecting body) laminate. Then, the edges of the laminate excluding one edge are sealed with an insulating resin and if desired, a polymerizable monomer-containing material or an electrolyte-containing solution is further injected. Thereafter, the polymerizable monomer-containing material is polymerized and then the unsealed edge is sealed with an insulating resin to produce a battery.

Further, as another embodiment of the method for producing a battery of the present invention is cited a method which includes injecting a mixture of the. above-described monomer, an electrolyte for use in an electrolytic solution for a battery, a solvent, other polymerizable compound and/or a granular support serving as a spacer in the space between the positive and negative electrodes temporarily arranged in a battery-constituting structure and polymerizing the mixture while applying an appropriate pressure to laminated surfaces of the resulting positive electrode/the mixture/negative electrode laminate to form a battery having a separator comprising a film described in items [1] to [12]. In this production method, it is desirable that the interelectrode distance of the battery is controlled to a desired distance by previously disposing the above-described framelike spacer or film-form support having a desired thickness between the positive and negative electrodes. However, this does not have to be done when the mixture containing the above-described granular support is used since the granular support can be used for controlling the inter-electrode distance. Thus, the method for producing a battery in the manner as described above using the mixture containing a granular support is one of the very preferred methods.

The electrical double-layer capacitor of the present invention is described below.

When the above-described separator of the present invention is used in the electrical double-layer capacitor of the present invention, an electrical double-layer capacitor, particularly a whole solid electrical double-layer capacitor, having a high output voltage, a large takeout current and excellent processability and reliability can be provided.

Figure 4:
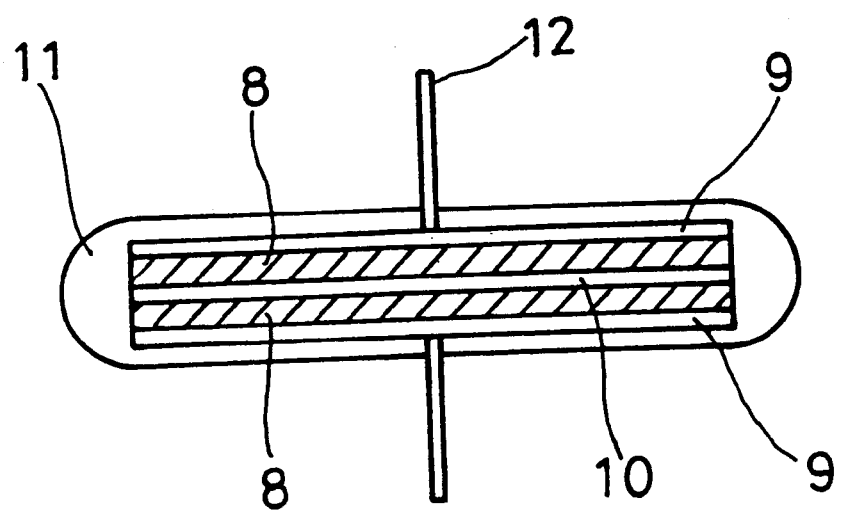
FIG. 4 is a schematic cross section of an electrical double-layer capacitor produced in the Example.

FIG. 4 shows a schematic cross section of one example of the electrical double-layer capacitor of the present invention. This example is a thin-type cell having a size of 1 cm×1 cm and a thickness of about 0.5 mm, where 9 is a current collecting body, a pair of polarizable electrodes 8 is disposed inside of the current collecting body, and a separator 10 of the present invention is disposed therebetween. The numeral 11 is an insulating resin sealant (cured product) and 12 is a lead wire.

The material for the current collecting body 9 is not particularly restricted and may be sufficient if it is an electronically conductive and electrochemically stable material, however, materials having a specific surface area of as large as possible is preferably used. Examples thereof include stainless steel, various metals and a sintered body thereof, electron conductive polymers, carbon sheet and graphite materials.

The polarizable electrode 8 may be an electrode formed of a polarizable material such as carbon materials usually used in an electrical double-layer capacitor, however, the carbon material is preferably compounded with the same polymer as the constituent component of the separator of the present invention. The carbon material as a polarizable material is not particularly restricted as long as it has a large specific surface area, however, carbon materials having a larger specific surface area are preferred because the electrical double-layer can have a larger capacity. Examples thereof include carbon blacks such as furnace black, thermal black (including acetylene black) and channel black, activated carbons such as coconut husk carbon, natural graphite, artificial graphite, so-called pyrolytic carbon obtained by a vapor phase process and a graphitized product thereof, and furalenes such as $C_{60}$ and $C_{70}$.

The kind of the electrolyte used in the compounding in case of an electrical double-layer capacitor of the present invention, is not particularly restricted and compounds containing an ion intended to be a charge carrier may be used, however, the compound preferably has a large dissociation constant in a solid polymer electrolyte or electrolytic solution formed and contains ions which readily form an electrical double layer on a polarizable electrode. Examples of such a compound include quaternary ammonium salts such as $(CH_3)_4NBF_4$ and $(CH_3CH_2)_4NClO_4$, transition metal salts such as $AgClO_4$, quaternary phosphonium salts such as $(CH_3)_4PBF_4$, alkali metal salts such as $LiCF_3SO_3$, $LiPF_6$, $LiClO_4$, $LiI$, $LiBF_4$, $LiSCN$, $LiAsF_6$, $NaCF_3SO_3$, $NaPF_6$, $NaClO_4$, $NaI$, $NaBF_4$, $NaAsF_6$, $KCF_3SO_3$, $KPF_6$ and $KI$, organic acids such as p-toluenesulfonic acid and salts thereof, and inorganic acids such as hydrochloric acid and sulfuric acid. Among these, preferred are quaternary ammonium salts, quaternary phosphonium salts and alkali metal salts because of their large dissociation constant and capability of giving high output voltage. Among quaternary ammonium salts, preferred are those having different substituents on the nitrogen of the ammonium ion such as $(CH_3CH_2)(CH_3CH_2CH_2CH_2)_3NBF_4$ because of their high solubility and dissociation constant in the solid polymer electrolyte or electrolytic solution formed.

Examples of the production method of an electrical double-layer capacitor of the present invention are described below.

An example of the production method of an electrical double-layer capacitor of the present invention is a method for producing an electrical double-layer capacitor comprising a step of laminating two sheets of polarizable electrodes and a separator comprising the film described in items [1] to [12] in any order to form an electrode/separator/electrode laminate with the separator being interposed between two sheets of polarizable electrodes as a capacitor-constituting structure, and a step of filling the capacitor-constituting structure having the above-described construction with a liquid material containing at least one electrolyte as an essential constituent component.

Another example of the production method of an electrical double-layer capacitor of the present invention is a method for producing an electrical double-layer capacitor comprising a step of laminating two sheets of polarizable electrodes and a separator comprising the film described in items [1] to [12] in any order to form an electrode/separator/ electrode laminate with the separator being interposed between two sheets of polarizable electrodes as a capacitor-constituting structure, a step of filling the capacitor-constituting structure having the above-described construction with a polymerizable monomer-containing material containing, as essential constituent components, at least one electrolyte and at least one acryloyl-base or methacryloyl-base compound having a structure containing a unit represented by formula (1) or (2), and a step of polymerizing the polymerizable monomer-containing material.

Another example of the production method of an electrical double-layer capacitor of the present invention is a method for producing an electrical double-layer capacitor having a separator comprising the film described in items [1] to [12], which comprises a step of laminating two sheets of polarizable electrodes and a porous support in any order to form an electrode/porous support/electrode laminate with the support being interposed between two sheets of polarizable. electrodes as a capacitor-constituting structure, a step of filling the capacitor-constituting structure having the above-described construction with a polymerizable monomer-containing material containing, as essential constituent components, at least one electrolyte and at least one acryloyl-base or methacryloyl-base compound containing a unit represented by formula (1) or (2), and a step of polymerizing the polymerizable monomer-containing material.

Another example of the production method of an electrical double-layer capacitor of the present invention is a method for producing an electrical double-layer capacitor comprising a step of previously impregnating and/or coating at least one of two polarizable electrodes with a polymerizable monomer-containing material containing an acryloyl-base or methacryloyl-base compound having a structure containing a unit represented by formula (1) or (2) or further containing at least one electrolyte, as an essential component (s), a step of forming an electrode/separator/electrode laminate with the separator being interposed between two sheets of polarizable electrodes as an electrical double-layer capacitor-constituting structure using two sheets of polarizable electrodes and a separator comprising the film described in items [1] to [12], and a step of polymerizing the polymerizable monomer-containing material.

In the above-described methods for producing a capacitor of the present invention, the term "filling the capacitor-constituting structure having the above-described construction" implies filling the above-described polymerizable monomer-containing material or liquid material as much as possible in the space allowable of substantial invasion by the material within the structure and covering the surface of the structure with the polymerizable monomer-containing material or liquid material. In other words, it is not limited only to the impregnation and/or coating of the inside and/or the surface of the structure with the polymerizable monomer-containing material or liquid material, but also includes the filling as much as possible of the polymerizable monomer-containing material or liquid material in the space between a structure constituting (or for constituting) an external surface and the capacitor-constituting structure, which is provided when the capacitor-constituting structure is disposed in another structure for constituting a capacitor, for example, in a structure constituting or for constituting the external surface of a capacitor such as a cylindrical capacitor, a coin-type capacitor or a sheet capacitor, more specifically, in the case of a cylindrical capacitor, inside the cylinder for constituting the cylindrical capacitor.

In the production method of a capacitor of the present invention, the polarizable electrode or the separator of the present invention is not limited to those formed on a support, however, they are preferably used in the production of a capacitor after they are shaped into a sheet or a film and therefore, the electrode or the separator of the present invention is preferably shaped into a sheet or a film on a support made of a different material.

The separator of the present invention may be formed on a support other than the current collecting body and the electrode which constitute a part of the capacitor-constituting structure, for example, on an organic polymer support such as polyethylene terephthalate and polytetrafluoroethylene or on an inorganic support such as glass, and after processing it into a desired shape and separating it from the support, or after separating it from the support and processing it into a desired shape, the separator may be used in the production of the capacitor of the present invention.

Or, the separator of the present invention may be formed on an electrode constituting a part of the capacitor-constituting structure as a support and if desired, after processing it into a desired shape, used in the production of the capacitor of the present invention.

Similarly, the polarizable electrode for use in the production of the capacitor of the present invention may be formed on a support other than the current collecting body and the electrode which constitute a part of the capacitor-constituting structure and after processing it into a desired shape before or after separation from the support, used in the production of the capacitor of the present invention, or the electrode may be formed, for example, on the current collecting body and if desired, after processing it into a desired shape without separating it from the support, used in the production of the capacitor of the present invention.

The polarizable electrode for use in various methods for producing a capacitor of the present invention may be a electrode/current collecting body laminate prepared by previously laminating a current collecting body for use in the construction of a capacitor on a electrode. The use of such a laminate is more preferred in view of the production process.

Further, at least one of the polarizable electrode, the porous support and the separator for use in the production method of a capacitor of the present invention may be previously impregnated and/or coated with a polymerizable monomer-containing material containing as an essential constituent component at least one acryloyl-base or methacryloyl-base polymerizable compound (monomer) having a structure containing a unit(s) represented by formula (1) or (2), or with a polymerizable monomer-containing material containing the monomer and at least one electrolyte as essential components. By coating at least one of the electrodes, the porous support and the separator with the above-described polymerizable monomer-containing material before use in the production of a capacitor, the capacitor produced is improved in the adhesion between the electrode and the separator to each other. When holes are present in the electrode or the separator before impregnation/coating or in the case of a porous support, by previously impregnating them with the above-described polymerizable monomer-containing material, the monomer and/or the electrolyte can present even in the holes within the electrodes or the separator.

As described above, when a polymerizable monomer-containing material is previously impregnated in and/or coated on the electrode, the porous support or the separator and after forming a capacitor-constituting structure, polymerized, very good adhesion can be provided between respective constituent elements of electrode/separator/electrode or current collecting body/electrode/separator/electrode/current collecting body, thereby achieving improvement in the capacity density, the current density or the cyclability of the capacitor produced. Thus, this is one of very preferred methods.

In the above-described production method of a capacitor according to the present invention, when the polymerizable monomer-containing material is impregnated in and/or coated on the capacitor-constituting structure, the polymerizable monomer-containing material is polymerized in a subsequent step by the same method as the polymerization method described above for obtaining a polymer from at least one polymerizable compound having a unit(s) represented by formula (1) and/or formula (2) and/or a copolymer containing the compound as a copolymer component. For example, the material is polymerized by heating and/or irradiation of electromagnetic wave or after the polymerization, if desired, further processed through a step of sealing the unsealed portion of the capacitor-constituting structure with an insulating resin such as polyolefin rein or epoxy resin, thereby obtaining a capacitor comprising an electrode and an electrolyte in good contact with each other.

In constructing a capacitor using a separator comprising the film of the present invention, the above-described electrode/separator/electrode laminate structure may be constructed by disposing a spacer at an optional periphery portion on the surface of at least one of the polarizable electrodes on the side facing the separator (at the edge portion of the electrode on the above-described surface), such as insulating protective sheet, protective frame or protective ring having a surface area corresponding to 40% or less, preferably 10% or less of the surface area of the above-described surface. By having such a construction, the capacitor of the present invention can achieve a proper and uniform distance between two sheets of polarizable electrodes, or short-circuit or deterioration of the capacitor capability due to concentration of the mechanical stress towards the periphery of the electrode, which may be caused at the time of assembling, can be prevented, and as a result, the reliability of the capacitor increases. Accordingly, the above-described construction is one preferred embodiment of the production method particularly of a thin electrical double-layer capacitor.

For example, according to one preferred embodiment of the method for producing an electrical double-layer capacitor of the present invention, particularly a thin whole solid electrical double-layer capacitor such as a sheet capacitor, at least one of two sheets of polarizable electrodes is previously impregnated and/or coated with the above-described polymerizable monomer-containing material, a film for separator of the present invention is used as a separator, and an insulating spacer is disposed at an optional periphery portion on the surface of at least one of the two sheets of electrodes on the side facing the separator to form a (current collecting body/)electrode (with a spacer)/separator/electrode (if desired, with a spacer) (/current collecting body) laminate. Then, the edges of the laminate excluding one edge are sealed with an insulating resin and if desired, a polymerizable monomer-containing material or an electrolyte-containing solution is further injected. Thereafter, the polymerizable monomer-containing material is polymerized and then the unsealed edge is sealed with an insulating resin to produce a capacitor. The spacer is not particularly restricted and may be sufficient if it is an insulating material; either organic materials or inorganic materials may be used, however, in view of stability and working property of the capacitor, polymer materials such as polyimide and polyolefin including polyethylene and polypropylene are preferred.

Further, as another embodiment of the method for producing an electrical double-layer capacitor of the present invention is cited a method which includes injecting a mixture of the above-described monomer, an electrolyte, a solvent, other polymerizable compound and/or a granular support serving as a spacer in the space between two polarizable electrodes temporarily arranged in a capacitor-constituting structure and polymerizing the mixture while applying an appropriate pressure to laminated surfaces of the resulting electrode/the mixture/electrode laminate to form an electrical double-layer capacitor having a separator comprising a film described in items [1] to [12]. In this production method, it is desirable that the inter-electrode distance of the capacitor is controlled to a desired distance by previously disposing the above-described frame-like spacer or film-form support having a desired thickness between the two electrodes. However, this does not have to be done when the mixture containing the above-described granular support is used since the granular support can be used for controlling the inter-electrode distance. Thus, the method for producing an electrical double-layer capacitor in the manner as described above using the mixture containing a granular support is one of the very preferred methods.

In producing a polarizable electrode containing a polarizable material such as carbon material and a polymer obtained from at least one polymerizable compound containing a unit(s) represented by formula (1) and/or (2) and/or a copolymer containing the compound as a copolymer component, which is preferably used in the electrical double-layer capacitor of the present invention, for example, at least one polymerizable compound (monomer) containing a unit(s) represented by formula (1) and/or (2) and if desired, further other polymerizable compound and/or a plasticizer are added and mixed with a polarizable material. In this case, the mixing ratio of respective components is set appropriately according to the objective capacitor. The thus-obtained mixture of a polymerizable compound and a polarizable material is formed into a film on a support, for example, a current collecting body, and then polymerized in the same method as the polymerization method described above for obtaining a polymer from at least one polymerizable compound containing a unit(s) represented by formula (a) and/or (2) or a copolymer containing the compound as a copolymer component, for example, polymerized by heating and/or irradiation of electromagnetic wave, to produce a polarizable electrode. According to this method, a composite film electrode in good contact with the current collecting body can be produced and in particular, a thin electrode can be obtained.

According to the above-described production method of the present invention, for example, when a separator of the present invention is interposed between two sheets of polarizable electrodes produced as above to form an electrode/separator/electrode laminate, the laminate is impregnated with a polymerizable monomer-containing material prepared by mixing a monomer with an electrolyte and if desired, by further adding and mixing thereto other polymerizable compound and/or a plasticizer, and then polymerized in the same method as described above, or after the polymerization, if desired, subjected to sealing of the unsealed portion of the capacitor-constituting structure with an insulating resin such as polyolefin resin or epoxy resin, an electrical double-layer capacitor comprising an electrode and an electrolyte in good contact with each other can be obtained. In preparing the above-described monomer mixture, the mixing ratio of respective components may be selected appropriately according to the objective capacitor.

The constituent material constituting the outer surface of the capacitor or the above-described support may be a metal such as SUS, a resin such as polypropylene or polyimide, or a ceramic material such as electroconductive or insulating glass, however, they are not particularly limited to these materials. The shape thereof may be any of cylinder, box, sheet, and others.

The electrical double-layer capacitor can be in a shape, in addition to the sheet as shown in FIG. 4, having a structure such that a spacer having a prescribed thickness is provided at the edge portion between polarizable electrodes and a film for separator having the same thickness is interposed therebetween. Or, a coin capacitor or a cylindrical capacitor produced by rolling a sheet laminate of polarizable electrodes with the separator of the present invention into a cylinder, placing it in a cylindrical tube-type structure for constituting capacitor and sealing the structure, may be used.

In producing a roll-type capacitor, a method where the above-described polarizable electrodes are laminated by facing with each other through a separator sheet which is previously prepared and then rolled, or they are laminated at the same time with rolling, to form an electrode/separator/electrode laminate, the laminate is inserted into a structure for constituting cylindrical capacitor and then the above-described polymerizable monomer-containing material is injected therein and polymerized, may also be used.

Advantageous Effects

The film for separator of an electrochemical apparatus of the present invention is outstandingly characterized in that a function as a separator having no electron conductivity and a function as a solid polymer electrolyte having excellent ion conductivity are provided at the same time, and contains, as a constituent component, an acryloyl- or alkyl-substituted acryloyl-base cross-linked polymer having an oxyalkylene group or an acryloyl or alkyl-substituted acryloyl-base cross-linked polymer having an oxyalkylene group connected to a urethane bond, which polymer can be easily formed into a film and compounded from the above-described raw material monomer. Generally, the strength and the ion conductivity of a film are incompatible properties because the former becomes lower when the latter is made higher. We have, however, succeeded in developing a film which has high ion conductivity as well as good film strength by using the above-mentioned acryloyl- or alkyl-substituted acryloyl-base cross-linked polymer having an oxyalkylene group and/or a urethane bond. Accordingly, the film can be easily and uniformly processed, exhibits high electrolytic solution-absorbing capability or electrolyte-holding capability, ensures good film strength (specifically, a high tensile strength more than $5kg/cm^2$ and a high modulus of elasticity more than $10^7 dyn/cm^2$ when the electrolyte solution is absorbed) is produced at low cost, and provides excellent reliability.

Further, by combining the film for separator of an electrochemical apparatus of the present invention with a solid polymer electrolyte, a battery or capacitor free of leakage of the solution can be obtained because the separator of an electrochemical apparatus of the present invention is excellent in the solution absorbing capability.

The battery of the present invention can be easily processed into a thin film by using a separator comprising a polymer or copolymer of a polymerizable compound having a structure containing a unit(s) represented by formula (1) or (2). The battery is free from the fear of short circuit even if it is a thin film, large in the takeout current and high in the reliability. In particular, a whole solid type battery can be obtained. Further, the battery of the present invention which has a negative electrode comprising an electrode containing an electroactive material such as lithium, lithium alloy or a carbon material capable of occluding and releasing lithium ions, can be easily processed into a thin film by using a separator comprising the above-described ion conductive polymer or copolymer. The battery is free from the fear of short circuit even if it is a thin film, large in the takeout current and high in the reliability. In particular, a whole solid type battery can be obtained.

The battery of the present invention, which uses the film for separator of the present invention as a separator, has a positive electrode comprising an electrode containing a polymer obtained from at least one polymerizable compound having a unit(s) represented by formula (1) and/or (2) and/or a copolymer containing the compound as a copolymer component, and an organic solvent-soluble aniline-base polymer or other electroactive material such as an electroconductive polymer, a metal oxide, a metal sulfide or a carbon material, and uses as an electrolyte a solid polymer electrolyte containing the above-described polymer or copolymer as a constituent component, can be easily processed into a thin film. The battery is free from the fear of short circuit even if it is a thin film, large in the takeout current, high in the capacity and high in the reliability. In particular, a whole solid type battery can be obtained.

According to the production method of a battery of the present invention, batteries of various shapes can be produced. In particular, a thin battery can be easily produced. The battery can work at a high capacity and a high current, has good cyclability and is excellent in the reliability. Particularly, a whole solid type battery can be produced.

The electrical double-layer capacitor of the present invention is free of short circuit even if it is a thin film, large in the output voltage and in the takeout current, and high in the reliability. In particular, a whole solid type electrical double-layer capacitor can be obtained.

Particularly, according to the electrical double-layer capacitor and the production method thereof of the present invention, the polarizable electrode can be in good contact with an ion conductive separator, electrolyte or electrolytic solution. Accordingly, an electrical double-layer capacitor which is free of short circuit even if it is a thin film, large in the output voltage and the takeout current, and high in the reliability, can be provided. In particular, a whole solid type capacitor can be obtained by using a solid polymer electrolyte and the separator of the present invention.

The method for producing a battery or electrical double-layer capacitor of the present invention is characterized by forming an electrode/separator/electrode laminate (which may include, as described above, a current collecting body or a spacer) using a separator of the present invention having the above-described property and in addition, by comprising a step of filling the laminate (a battery or electrical double-layer capacitor-constituting structure) with the above-described polymerizable monomer-containing material and polymerizing the polymerizable monomer-containing material. The production method is advantageous in that a battery or an electrical double-layer capacitor having excellent properties described above can be produced.

BEST MODE FOR CARRYING OUT THE INVENTION

Hereinafter, the present invention will be described in greater detail by referring to the following representative examples. However, these examples are set forth only for description but the present invention should not be construed as being limited thereto. In the following examples, the term "placed" is not restricted to the spatially vertical relation but includes the state such that the place and the material to be placed are disposed in contact with each other. Further, in the following examples, unless otherwise indicated, each process in the production of a battery, a capacitor or a constituting structure thereof was performed in a glove box under an argon atmosphere, however, the present invention is by no means limited thereto and can be performed even in other atmosphere of causing no problem in producing a film, battery or capacitor of the present invention. Tensile strength was measured at 25° C. at a stretching rate of 500 mm/min using TENSILON and the modulus of elasticity at −40 to 100° C. on the frequency condition of 110 Hz using RHEOVIBRON.

[Example 1]

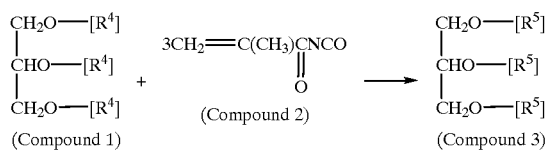

[wherein [$R^4$] represents $(CH_2CH_2O)_m[CH(CH_3)CH_2O]_nH$ and [$R^5$] represents

<Synthesis of Compound 3>

In 100 ml of a well-purified THF, 57.7 g of Compound 1 (KOH value: 34.0 mg/g, m/n=4) and 3.89 g of Compound 2 (methacryloyl isocyanate) were dissolved under a nitrogen atmosphere, and thereto 0.44 g of dibutyltin dilaurate was added. Thereafter, the mixture was reacted at 25° C. for about 15 hours to obtain a colorless viscous liquid. From the results of $^1$H-NMR, IR and elemental analysis thereof, it was verified that Compound 1 and Compound 2 were reacted at a molar ratio of 1:3, the isocyanate group of Compound 2 disappeared, a urethane bond was produced, and Compound 3 was produced.

Under an argon atmosphere, to 1.50 g of Compound 3, 0.01 g of 2-hydroxy-2-methyl-1-phenyl-propan-1-one (Dalocure 1173, trade name, produced by Ciba Geigy AG) was added and well mixed. Onto a 10 cm-square-size polyethylene terephthalate film (PET film), the resulting mixture (polymerizable monomer-containing material) was coated and then irradiated under a mercury lamp for 10 minutes. As a result, a transparent free-standing film containing a polymer of Compound 3 as a constituent component and having a thickness of about 20 μm was obtained on the PET film. The polymer film exhibited a tensile strength of 45 kg/cm$^2$ and a modulus of elasticity of more than 108 dyn/cm$^2$. When the film obtained was dipped in an electrolytic solution (1.5 mol/λ of LiBF$_4$/EC (ethylene carbonate)+DEC (diethyl carbonate) (weight ratio: 1:1)) for about 1 hour, it absorbed the electrolytic solution of about 2.5 times (by weight). After the solution absorption, the ion conductivity of the film at 25° C. was measured by an impedance method and determined to be 1×10$^{-3}$ S/cm. The film exhibited a tensile strength of 25 kg/cm$^2$ and a modulus of elasticity of more than 10$^8$ dyn/cm$^2$.

In the following examples, when the thus-obtained film was used as a separator, the film after the solution absorption was cut into a desired size and then used.

EXAMPLE 2

Under an argon atmosphere, 1.50 g of Compound 3, 1.5 g of diethyl carbonate (DEC), 1.5 g of ethylene carbonate (EC), 0.30 g of LiBF$_4$ and 0.02 g of Dalocure 1173 were well mixed to obtain a polymerizable monomer-containing material.

The resulting polymerizable monomer-containing material was coated on a 10 cm-square-size PET film under an argon atmosphere and irradiated under a mercury lamp for 10 minutes. As a result, a transparent free-standing film containing as a constituent component a polymer of Compound 3 impregnated with an electrolytic solution and having a thickness of about 50 μm was obtained on the PET film. The ion conductivity of the film at 25° C. was measured by an impedance method and determined to be 2×10$^{-3}$ S/cm. The film exhibited a tensile strength of 18 kg/cm$^2$ and a modulus of elasticity of more than 10$^8$ dyn/cm$^2$.

In the following examples, when the thus-obtained film was used as a separator, the film was cut into a desired size and then used.

EXAMPLE 3

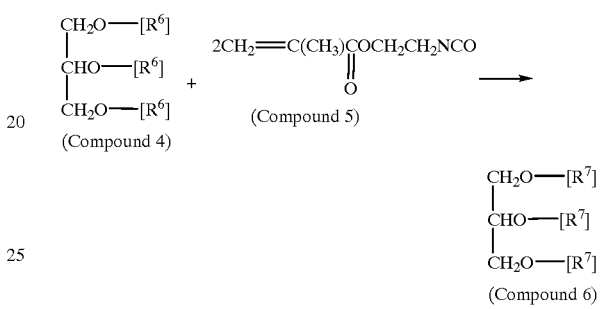

[wherein [$R^6$) represents a 2:1 mixture group of $(CH_2CH_2O)_m[CH(CH_3)CH_2O]_nH$ and $(CH_2CH_2O)_m[CH(CH_3)CH_2O]_nCH_3$, and

[$R^7$]represents a 2:1 mixture group of

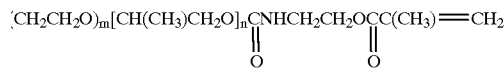

and $(CH_2CH_2O)_m[CH(CH_3)CH_2O]_nCH_3$.]

<Synthesis of Compound 6>

In 100 ml of a well-purified THF, 38.5 g of Compound 4 (KOH value: 22.7 mg/g, m/n=5) and 2.42 g of Compound 5 (methacryloyloxyethyl isocyanate) were dissolved under a nitrogen atmosphere, and thereto 0.29 g of dibutyltin dilaurate was added. Thereafter, the mixture was reacted at 25° C. for about 15 hours to obtain a colorless viscous liquid. From the results of $^1$H-NMR, IR and elemental analysis thereof, it was verified that Compound 4 and Compound 5 were reacted at a molar ratio of 1:2, the isocyanate group of Compound 5 disappeared, a urethane bond was produced, and Compound 6 was produced.

Under an argon atmosphere, to 1.50 g of Compound 6, 0.01 g of Dalocure 1173 was added and well mixed. The resulting mixture (polymerizable monomer-containing material) was coated on a 10 cm-square-size PET film and then irradiated under a mercury lamp for 10 minutes. As a result, a transparent free-standing film containing a polymer of Compound 6 as a constituent component and having a thickness of about 20 μm was obtained on the PET film. The film exhibited a tensile strength of 40 kg/cm$^2$ and a modulus of elasticity of more than 10$^8$ dyn/cm$^2$. When the film obtained was dipped in an electrolytic solution (1.5 mol/e of LiBF$_4$/EC (ethylene carbonate)+DEC (diethyl carbonate)

(weight ratio: 1:1)) for about 1 hour, it absorbed the electrolytic solution of about 3.0 times (by weight). After the solution absorption, the ion conductivity of the film at 25° C. was measured by an impedance method and determined to be $1.0 \times 10^{-3}$ S/cm. The film exhibited a tensile strength of 14 kg/cm$^2$ and a modulus of elasticity of more than $10^8$ dyn/cm$^2$.

In the following examples, when the thus-obtained film was used as a separator, the film after the solution absorption was cut into a desired size and then used.

EXAMPLE 4

A transparent free-standing film containing a polymer of Compound 3 impregnated with an electrolytic solution as a constituent component and having a thickness of about 50 μm was obtained in the same manner as in Example 2 except for using 0.40 g of NaCF$_3$SO$_3$ in place of LiBF$_4$ used in Example 2. The ion conductivity of the film at 25° C. was measured by an impedance method and determined to be $2 \times 10^{-3}$ S/cm.

In the following examples, when the thus-obtained film was used as a separator, the film was cut into a desired size and then used.

EXAMPLE 5

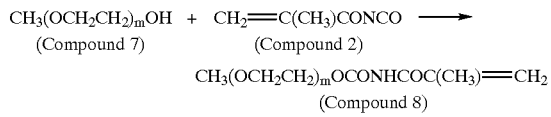

<Synthesis of Compound 8>

In 100 ml of a well-purified THF, 55 g of Compound 7 (average molecular weight Mn=550) and 11.1 g of Compound 2 were dissolved under a nitrogen atmosphere, and thereto 0.66 g of dibutyltin dilaurate was added. Thereafter, the mixture was reacted at 25° C. for about 15 hours to obtain a colorless viscous liquid. From the results of $^1$H-NMR, IR and elemental analysis thereof, it was verified that Compound 7 and Compound 2 were reacted at a molar ratio of 1:1, the isocyanate group of Compound 2 disappeared, a urethane bond was produced, and Compound 8 was produced.

Under an argon atmosphere, to a mixture of 1.00 g of Compound 3 synthesized in Example 1 and 0.5 g of Compound 8 synthesized above, 0.01 g of Dalocure 1173 was added and well mixed. The resulting mixture (polymerizable monomer-containing material) was coated on a 10 cm-square-size PET film and then irradiated under a mercury lamp for 10 minutes. As a result, a transparent free-standing film containing a copolymer of Compound 3 and Compound 8 as a constituent component and having a thickness of about 20 μm was obtained on the PET film. The film exhibited a tensile strength of 30 kg/cm$^2$ and a modulus of elasticity of more than $10^8$ dyn/cm$^2$. When the film obtained was dipped in an electrolytic solution (1.5 mol/λ of LiBF$_4$/EC (ethylene carbonate)+DEC (diethyl carbonate) (weight ratio: 1:1)) for about 1 hour, it absorbed the electrolytic solution of about 2.5 times (by weight). The ion conductivity of the film after the solution absorption at 25° C. was measured by an impedance method and determined to be $1.5 \times 10^{-3}$ S/cm. The film exhibited a tensile strength of 12 kg/cm$^2$ and a modulus of elasticity of more than $10^8$ dyn/cm$^2$.

In the following examples, when the thus-obtained film was used as a separator, the film after the solution absorption was cut into a desired size and then used.

EXAMPLE 6

Under an argon atmosphere, 1.00 g of Compound 3, 0.5 g of Compound 8, 1.5 g of diethyl carbonate (DEC), 1.5 g of ethylene carbonate (EC), 0.30 g of LiBF$_4$ and 0.02 g of Dalocure 1173 were well mixed to obtain a polymerizable monomer-containing material. The resulting polymerizable monomer-containing material was coated on a 10 cm-square-size PET film under an argon atmosphere and then irradiated under a mercury lamp for 10 minutes. As a result, a transparent free-standing film containing a copolymer of Compound 3 and Compound 8 impregnated with an electrolytic solution as a constituent component and having a thickness of about 50 μm was obtained on the PET film. The ion conductivity of the film at 25° C. was measured by an impedance method and determined to be $3 \times 10^{-3}$ S/cm. The film exhibited a tensile strength of 15 kg/cm$^2$ and a modulus of elasticity of more than $10^8$ dyn/cm$^2$.

In the following examples, when the thus-obtained film was used as a separator, the film was cut into a desired size and then used.

EXAMPLE 7

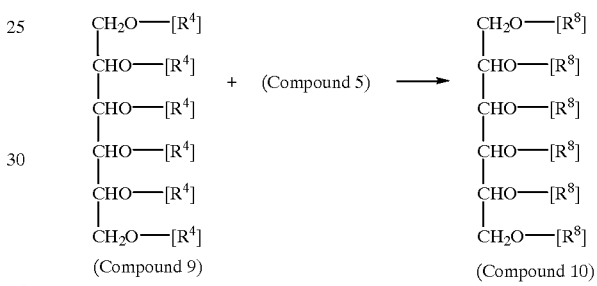

[wherein [R$^4$] represents (CH$_2$CH$_2$O)$_m$[CH(CH$_3$)CH$_2$O]$_n$H and [R$^8$] represents

<Synthesis of Compound 10>

In 100 ml of a well-purified THF, 57.7 g of Compound 9 (KOH value: 68.0 mg/g, m/n=6) and 10.86 g of Compound 5 were dissolved under a nitrogen atmosphere, and thereto 0.44 g of dibutyltin dilaurate was added. Thereafter, the mixture was reacted at 25° C. for about 15 hours to obtain a colorless viscous liquid. From the results of $^1$H-NMR, IR and elemental analysis thereof, it was found that Compound 9 and Compound 5 were reacted at a molar ratio of 1:6, the isocyanate group of Compound 5 disappeared, a urethane bond was produced, and Compound 10 was produced.

Under an argon atmosphere, to 1.50 g of Compound 10, 0.01 g of Dalocure 1173 was added and well mixed. The resulting mixture (polymerizable monomer-containing material) was coated on a 10 cm-square-size PET film and then irradiated under a mercury lamp for 10 minutes. As a result, a transparent free-standing film containing a polymer of Compound 10 as a constituent component and having a thickness of about 20 μm was obtained on the PET film. The film exhibited a tensile strength of 35 kg/cm$^2$ and a modulus of elasticity of more than $10^8$ dyn/cm$^2$. When the film obtained was dipped in an electrolytic solution (1.5 mol/e of LiBF$_4$/EC (ethylene carbonate)+DEC (diethyl carbonate) (weight ratio: 1:1)) for about 1 hour, it absorbed the electrolytic solution of about 3.0 times (by weight). The ion conductivity of the film after the solution absorption at 25° C. was measured by an impedance method and determined to be $1 \times 10^{-3}$ S/cm. The film exhibited a tensile strength of 16 kg/cm$^2$ and a modulus of elasticity of more than $10^8$ dyn/cm$^2$.

In the following examples, when the thus-obtained film was used as a separator, the film after the solution absorption was cut into a desired size and then used.

EXAMPLE 8

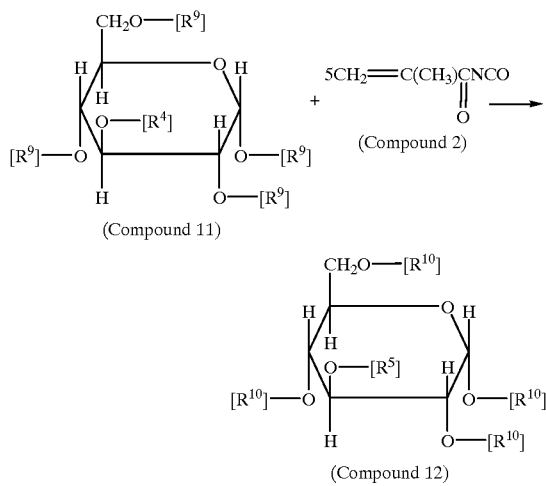

[wherein [R$^4$] represents $(CH_2CH_2))_m[CH(CH_3)CH_2O]_nH$, [R$^5$] represents

[R$^9$] represents $(CH_2CH_2O)_m[CH(CH_3)CH_2O]_nH$, and [R$^{10}$] represents

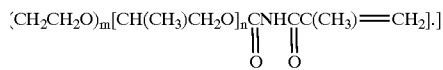

<Synthesis of Compound 12>

In 100 ml of a well-purified THF, 57.7 g of Compound 11 (KOH value: 68.0 mg/g) and 7.78 g of Compound 2 were dissolved under a nitrogen atmosphere, and thereto 0.44 g of dibutyltin dilaurate was added. Thereafter, the mixture was reacted at 25° C. for about 15 hours to obtain a colorless viscous liquid. From the results of $^1$H-NMR, IR and elemental analysis thereof, it was found that Compound 11 and Compound 2 were reacted at a molar ratio of 1:5, the isocyanate group of Compound 2 disappeared, a urethane bond was produced, and Compound 12 was produced.

Under an argon atmosphere, 1.50 g of Compound 12, 1.5 g of diethyl carbonate (DEC), 1.5 g of ethylene carbonate (EC), 0.30 g of LiBF$_4$ and 0.02 g of Dalocure 1173 were well mixed to obtain a polymerizable monomer-containing material.

The resulting polymerizable monomer-containing material was coated on a 10 cm-square-size PET film under an argon atmosphere and then irradiated under a mercury lamp for 10 minutes. As a result, a transparent free-standing film containing a polymer of Compound 12 impregnated with an electrolytic solution as a constituent component and having a thickness of about 50 μm was obtained on the PET film. The ion conductivity of the film at 25° C. was measured by an impedance method and determined to be $1 \times 10^{-3}$ S/cm. The film exhibited a tensile strength of 12 kg/cm$^2$ and a modulus of elasticity of more than $10^8$ dyn/cm$^2$.

In the following examples, when the thus-obtained film was used as a separator, the film was cut into a desired size and then used.

EXAMPLE 9

A transparent free-standing film containing a polymer of Compound 3 impregnated with an electrolytic solution as a constituent component and having a thickness of about 50 μm was obtained in the same manner as in Example 2 except for using 0.50 g of tetraethylammonium tetrafluoroborate (TEAB) in place of LiBF$_4$ used in Example 2. The ion conductivity of the film at 25° C. was measured by an impedance method and determined to be $3 \times 10^{-3}$ S/cm.

In the following examples, when the thus-obtained film was used as a separator, the film was cut into a desired size and then used.

EXAMPLE 10

A transparent free-standing film containing a polymer of Compound 3 impregnated with an electrolytic solution as a constituent component and having a thickness of about 50 μm was obtained in the same manner as in Example 2 except for using 0.35 g of LiPF$_6$ in place of LiBF$_4$ used in Example 2. The ion conductivity of the film at 25° C. was measured by an impedance method and determined to be $2 \times 10^{-3}$ S/cm.

In the following examples, when the thus-obtained film was used as a separator, the film was cut into a desired size and then used.

EXAMPLE 11

Under an argon atmosphere, to a mixture of 1.50 g of Compound 3 and 0.2 g of N,N-dimethylacrylamide, 0.01 g of Dalocure 1173 was added and well mixed. The resulting mixture (polymerizable monomer-containing material) was coated on a 10 cm-square-size PET film and then irradiated under a mercury lamp for 10 minutes. As a result, a transparent free-standing film containing a Compound 3/N,N-dimethylacrylamide copolymer as a constituent component and having a thickness of about 20 μm was obtained on the PET film. The film exhibited a tensile strength of 38 kg/cm$^2$ and a modulus of elasticity of more than $10^8$ dyn/cm$^2$. When the film obtained was dipped in an electrolytic solution (1.5 mol/λ of LiBF$_4$/EC (ethylene carbonate)+DEC (diethyl carbonate) (weight ratio: 1:1)) for about 1 hour, it absorbed the electrolytic solution of about 3.3 times (by weight). The ion conductivity of the film after the solution absorption at 25° C. was measured by an impedance method and determined to be $1.5 \times 10^{-3}$ S/cm. The film exhibited a tensile strength of 10 kg/cm$^2$ and a modulus of elasticity of more than $10^8$ dyn/cm$^2$.

In the following examples, when the thus-obtained film R was used as a separator, the film after the solution absorption was cut into a desired size and then used.

EXAMPLE 12

Under an argon atmosphere, to a mixture of 1.50 g of Compound 3 and 0.2 g of polyethylene oxide PEO-1 (produced by Sumitomo Seika KK), 0.01 g of Dalocure 1173 was added and well mixed. The resulting mixture (polymerizable monomer-containing material) was coated on a 10 cm-square-size PET film and then irradiated under a mercury lamp for 10 minutes. As a result, a transparent free-standing film containing a mixture of a polymer of Compound 3/polyethylene oxide PEO-1 as a constituent component and having a thickness of about 20 µm was obtained on the PET film. When the film obtained was dipped in an electrolytic solution (1.5 mol/u of $LiBF_4$/EC (ethylene carbonate) +DEC (diethyl carbonate) (weight ratio: 1:1)) for about I hour, it absorbed the electrolytic solution of about 2.8 times (by weight). The ion conductivity of the film after the solution absorption at 25° C. was measured by an impedance method and determined to be $0.8 \times 10^{-3}$ S/cm.

In the following examples, when the thus-obtained film was us ed as a separator, the film after the solution absorption was cut into a desired size and then used.

EXAMPLE 13

Under an argon atmosphere, 0.50 g of Compound 3, 1.00 g of Compound 8, 1.5 g of diethyl carbonate (DEC), 1.5 g of ethylene carbonate (EC), 0.30 g of $LiBF_4$ and 0.02 g of Dalocure 1173 were well mixed to obtain a polymerizable monomer-containing material.

The resulting polymerizable monomer-containing material was impregnated into and coated on a 10 cm-square-size polypropylene-made microporous film having a thickness of about 25 µm (Dulaguard 2500, produced by Hoechst AG; porosity: about 301%) under an argon atmosphere and then irradiated under a mercury lamp for 10 minutes. As a result, a composite film (thickness: 30 µm) with Dulaguard containing a Compound 3/Compound 8 copolymer impregnated with an electrolytic solution as a constituent component was obtained. The ion conductivity of the resulting film at 25° C. was measured by an impedance method and determined to be $5 \times 10^{-4}$ S/cm.

In the following examples, when the thus-obtained film was used as a separator, the film was cut into a desired size and then used.

EXAMPLE 14

Under an argon atmosphere, 1.50 g of Compound 3, 1.5 g of diethyl carbonate (DEC), 1.5 g of ethylene carbonate (EC), 0.30 g of $LiBF_4$ and 0.02 g of Dalocure 1173 were well mixed to obtain a polymerizable monomer-containing material.

The resulting polymerizable monomer-containing material was impregnated into and coated on a 10 cm-square-size polypropylene-made nonwoven fabric having a thickness of about 50 µm (porosity: about 60%) under an argon atmosphere and then irradiated under a mercury lamp for 10 minutes. As a result, a composite film (thickness: 50 µm) with the polypropylene-made nonwoven fabric containing a polymer of Compound 3 impregnated with an electrolytic solution as a constituent component was obtained. The ion conductivity of the resulting film at 25° C. was measured by an impedance method and determined to be $8 \times 10^{-4}$ S/cm.

In the following examples, when the thus-obtained film was used as a separator, the film was cut into a desired size and then used.

EXAMPLE 15

Under an argon atmosphere, 1.50 g of Compound 3, 1.5 g of diethyl carbonate (DEC), 1.5 g of ethylene carbonate (EC), 0.30 g of $LiBF_4$ and 0.02 g of Dalocure 1173 were well mixed to obtain a polymerizable monomer-containing material.

The resulting polymerizable monomer-containing material was impregnated into and coated on a 10 cm-square-size polyethylene-made net (250 mesh) having a thickness of about 50 µm under an argon atmosphere and then irradiated under a mercury lamp for 10 minutes. As a result, a composite film (thickness: about 50 µm) with the polyethylene-made net containing a polymer of Compound 3 impregnated with an electrolytic solution as a constituent component was obtained. The ion conductivity of the resulting film at 25° C. was measured by an impedance method and determined to be $1.2 \times 10^{-3}$ S/cm.

In the following examples, when the thus-obtained film was used as a separator, the film was cut into a desired size and then used.

EXAMPLE 16

Under an argon atmosphere, to 1.50 g of Compound 3, 0.01 g of 2,2-dimethoxy-1,2-diphenylethan-1-one (Irgacure 651, trade name, produced by Ciba Geigy AG) was added and well mixed. The resulting mixture (polymerizable monomer-containing material) was coated on a 10 cm-square-size PET film and then irradiated under a mercury lamp for 10 minutes. As a result, a transparent free-standing film containing a polymer of Compound 3 as a constituent component and having a thickness of about 20 µm was obtained on the PET film. When the film obtained was dipped in an electrolytic solution (1.5 mol/λ of $LiBF_4$/EC (ethylene carbonate)+DEC (diethyl carbonate) (weight ratio: 1:1)) for about 1 hour, it absorbed the electrolytic solution of about 2.5 times (by weight). The ion conductivity of the film after the solution absorption at 25° C. was measured by an impedance method and determined to be $1 \times 10^{-3}$ S/cm.

In the following examples, when the thus-obtained film was used as a separator, the film after the solution absorption was cut into a desired size and then used.

EXAMPLE 17

Under an argon atmosphere, 1.50 g of Compound 3, 1.5 g of diethyl carbonate (DEC), 1.5 g of ethylene carbonate (EC), 0.30 g of $LiBF_4$ and 0.02 g of Irgacure 651 were well mixed to obtain a polymerizable monomer-containing material.

The resulting polymerizable monomer-containing material was coated on a 10 cm-square-size PET film under an argon atmosphere and then irradiated under a mercury lamp for 10 minutes. As a result, a transparent free-standing film containing a polymer of Compound 3 impregnated with an electrolytic solution as a constituent component and having a thickness of about 50 µm was obtained on the PET film. The ion conductivity of the film obtained at 250C was measured by an impedance method and determined to be $2 \times 10^{-3}$ S/cm.

In the following examples, when the thus-obtained film was used as a separator, the film after the solution absorption was cut into a desired size and then used.

EXAMPLE 18

Production of lithium cobaltate positive electrode:

$Li_2CO_3$ (11 g) and 24 g of $Co_3O_4$ were well mixed, heated at 800° C. for 24 hours under an oxygen atmosphere and crushed to obtain $LiCoO_2$ powder. The $LiCoO_2$ powder, acetylene black and polyvinylidene fluoride were mixed at a weight ratio of 8:1:1, and thereto N-methylpyrrolidone in an amount of 5 times the weight of the mixture was added to obtain a gelled composition. On a stainless steel SUS316 foil (12 mm×12 mm) having a thickness of about 50 μm, a polyimide-made spacer frame for molding (thickness: 200 μm) having a width of 1 mm and an inner dimension of 10 mm×10 mm was placed, and the composition obtained above was molded by coating to have a thickness of about 200 μm. The molding was then vacuum dried under heating at about 100° C. for 24 hours to obtain a lithium cobaltate positive electrode (80 mg) adhering to the SUS foil. Before using it in Example 19, the spacer frame was removed to provide a positive electrode/current collecting body laminate (positive electrode: 10 mm×10 mm; current collecting body: 12 mm×12 mm).

EXAMPLE 19

Production of Li secondary battery:

In a glove box under an argon atmosphere, a 75 μm-thick lithium foil was cut into a size of 10 mm×10 mm (5.3 mg) and attached under pressure to the area of 10 mm×10 mm on a 50 Mm-thick SUS 316 foil (12 mm×12 mm) surface excluding the periphery of 1 mm from four edges to provide a lithium (negative electrode)/current collecting body laminate (negative electrode: 10 mm×10 mm; current collecting body: 12 mm×12 mm). Then, the film for separator after absorption of the electrolytic solution prepared in Example 1 was cut into a size of 10 mm×10 mm and placed as a separator on the lithium foil to provide a current collecting body/negative electrode/separator laminate and further on the separator surface, a lithium cobaltate positive electrode/current collecting laminate prepared in Example 18 and impregnated with an electrolytic solution (1.5 mol/λ of $LiBF_4$/EC+DEC (weight ratio: 1:1)) was placed such that the positive electrode surface faced the separator to prepare a current collecting body/positive electrode/separator/negative electrode/current collecting body laminate. The edge parts of this laminate were sealed with an epoxy resin to obtain a lithium/cobalt oxide type solid secondary battery. FIG. 1 shows a cross section of the battery obtained.

The battery was subjected to repeated charging/discharging at a working voltage of from 2.0 to 4.2 V and a current of 0.5 mA. As a result, the maximum discharge capacity was 7.3 mAh and the cycle life until the capacity was reduced to 50% was 250 times.

EXAMPLE 20

Production of graphite negative electrode:

MCMB graphite (produced by Osaka Gas K.K.), graphite fiber produced by vapor phase method (produced by Showa Denko K.K.; average fiber diameter 0.3 μm, average fiber length 2.0 μm, heat-treated at 2700° C.), and polyvinylidene fluoride were mixed at a weight ratio of 8.6:0.4:1.0, and thereto N-methylpyrrolidone in an amount of 10 times the weight of the mixture was added to obtain a gelled composition. On a stainless steel SUS 316 foil (12 mm×12 mm) having a thickness of about 50 μm, a polyimide-made spacer frame for molding (thickness: 250 μm) having a width of 1 mm and an inner dimension of 10 mm×10 mm was placed, and the composition obtained above was molded by coating to have a thickness of about 250 μm, in the same manner as in Example 18. The molding was then vacuum dried under heating at about 100° C. for 24 hours to obtain a graphite negative electrode (30 mg) adhering to the SUS 316 foil. Before using it in Example 21, the spacer frame was removed to provide a negative electrode/current collecting body laminate (negative electrode: 10 mm×10 mm; current collecting body: 12 mm×12 mm).

EXAMPLE 21

Production of Li ion secondary battery:

A graphite/lithium cobaltate type solid Li ion secondary battery was obtained in the same manner as in Example 19, except for using a graphite negative electrode/current collecting body laminate prepared in Example 20 and impregnated with an electrolytic solution (1.5 mol/λ of $LiBF_4$/EC+DEC (weight ratio: 1:1)) in place of a lithium/current collecting body laminate.

The battery was subjected to repeated charging/discharging at a working voltage of from 2.0 to 4.2 V and a current of 0.5 mA. As a result, the maximum discharge capacity was 7.3 mAh and the cycle life until the capacity was reduced to 50% was 250 times.

EXAMPLE 22

Under an argon atmosphere, 0.50 g of Compound 3, 1.00 g of Compound 8, 1.5 g of diethyl carbonate (DEC), 1.5 g of ethylene carbonate (EC), 0.30 g of $LiBF_4$ and 0.01 g of azobisisobutyronitrile (AIBN) were well mixed to obtain a polymerizable monomer-containing material.

In a glove box under an argon atmosphere, 75 μm-thick lithium foil was cut into a size of 10 mm×10 mm (5.3 mg) and attached under pressure to the area of 10 mm×10 mm on a 50 μm-thick SUS 316 foil (12 mm×12 mm) surface excluding the periphery of 1 mm from four edges to provide a lithium (negative electrode)/current collecting body laminate (negative electrode: 10 mm×10 mm; current collecting body: 12 mm×12 mm). Then, the polymerizable monomer-containing material obtained above was thinly (thickness: from 1 to 2 μm) coated on the lithium foil. The film for separator after absorption of the electrolytic solution prepared in Example 1 was cut into a size of 10 mm×10 mm and placed as a separator on the lithium foil coated with the monomer-containing material to provide a current collecting body/negative electrode/separator laminate and further on the separator surface, a lithium cobaltate positive electrode/current collecting laminate prepared in the same manner as in Example 18 and impregnated/coated with the polymerizable monomer-containing material prepared above was placed such that the positive electrode surface faced the separator to prepare a current collecting body/positive electrode/separator/negative electrode/current collecting body laminate. After heating the resulting laminate at 80° C. for 30 minutes to polymerize the polymerizable monomer-containing material, the edge parts of the laminate were sealed with an epoxy resin to obtain a lithium/cobalt oxide type solid secondary battery.

The battery was subjected to repeated charging/discharging at a working voltage of from 2.0 to 4.2 V and a current of 0.1 mA. As a result, the maximum discharge capacity was 7.3 mAh and the cycle life until the capacity was reduced to 50% was 200 times.

EXAMPLE 23

Production of solid Li secondary battery:

A lithium/lithium cobaltate type solid Li secondary battery was obtained in the same manner as in Example 2 except that the polymerizable monomer-containing material was thinly coated on the separator surface facing the lithium foil in place of coating the polymerizable monomer-containing material on the lithium foil.

The resulting battery was subjected to repeated charging/discharging at a working voltage of from 2.0 to 4.2 V and a current of 0.1 mA. As a result, the maximum discharge capacity was 7.3 mAh and the cycle life until the capacity was reduced to 50% was 250 times.

EXAMPLE 24

Production of solid Li ion secondary battery:

A graphite/lithium cobaltate type solid Li ion secondary battery was obtained in the same manner as in Example 22 except for using a graphite negative electrode/current collecting body laminate produced in the same manner as in Example 20 and impregnated/coated with a polymerizable monomer-containing material prepared in the same manner as in Example 22 in place of the lithium/current collecting body laminate coated with the polymerizable monomer-containing material.

The resulting battery was subjected to repeated charging/discharging at a working voltage of from 2.0 to 4.2 V and a current of 0.1 mA. As a result, the maximum discharge capacity was 7.3 mAh and the cycle life until the capacity was reduced to 50% was 380 times.

EXAMPLE 25

Production of solid Li ion secondary battery:

A graphite/lithium cobaltate type solid Li ion secondary battery was obtained in the same manner as in Example 23 except for using a Compound 3 polymer/polypropylene-made nonwoven fabric composite film impregnated with an electrolytic solution, produced in Example 14 as a separator.

The resulting battery was subjected to repeated charging/discharging at a working voltage of from 2.0 to 4.2 V and a current of 0. 1 mA. As a result, the maximum discharge capacity was 6.8 mAh and the cycle life until the capacity was reduced to 50% was 410 times.

EXAMPLE 26

Production of solid Li ion secondary battery:

A graphite/lithium cobaltate type solid Li ion secondary battery was obtained in the same manner as in Example 25 except for using a Compound 6 polymer film impregnated with an electrolytic solution, produced in Example 3 as a separator.

The resulting battery was subjected to repeated charging/discharging at a working voltage of from 2.0 to 4.2 V and a current of 0.1 mA. As a result, the maximum discharge capacity was 6.6 mAh and the cycle life until the capacity was reduced to 506 was 350 times.

EXAMPLE 27

Production of solid Li ion secondary battery:

A graphite/lithium cobaltate type solid Li ion secondary battery was obtained in the same manner as in Example 25 except for using a Compound 3/Compound 8 copolymer film impregnated with an electrolytic solution, produced in Example 5 as a separator.

The resulting battery was subjected to repeated charging/discharging at a working voltage of from 2.0 to 4.2 V and a current of 0.1 mA. As a result, the maximum discharge capacity was 7.3 mAh and the cycle life until the capacity was reduced to 50% was 300 times.

EXAMPLE 28

Production of solid Li ion secondary battery:

A graphite/lithium cobaltate type solid Li ion secondary battery was obtained in the same manner as in Example 25 except for using a Compound 3/N,N-dimethylacrylamide copolymer film impregnated with an electrolytic solution, produced in Example 11 as a separator.

The resulting battery was subjected to repeated charging/discharging at a working voltage of from 2.0 to 4.2 V and a current of 0.1 mA. As a result, the maximum discharge capacity was 7.0 mAh and the cycle life until the capacity was reduced to 50k was 280 times.

EXAMPLE 29

Production of solid Li ion secondary battery:

In a glove box under an argon atmosphere, the film for separator after absorption of the electrolytic solution prepared in Example 1 was cut into a size of 10 mm×10 mm and placed as a separator on the negative electrode surface of a graphite negative electrode/current collecting body laminate (negative electrode: 10 mm×10 mm; current collecting body: 12 mm×12 mm) prepared in the same manner as in Example 20 to provide a separator/negative electrode/current collecting body laminate. Further on the separator surface thereof, a lithium cobaltate positive electrode/current collecting laminate (12 mm×12 mm) prepared in the same manner as in Example 18 was placed to prepare a current collecting body/positive electrode/separator/negative electrode/current collecting body laminate. The edge parts excluding one edge part of this laminate were sealed with an epoxy resin. Thereafter, a polymerizable monomer-containing material produced in the same manner as in Example 22 was injected from the unsealed edge part under the reduced pressure state (up to 50 mmHg) over 2 minutes and heated at 80° C. for 30 minutes to polymerize the polymerizable monomer-containing material. Then, the unsealed edge part was sealed with an epoxy resin to obtain a graphite/cobalt oxide type solid Li ion secondary battery.

The battery was subjected to repeated charging/discharging at a working voltage of from 2.0 to 4.2 V and a current of 0.1 mA. As a result, the maximum discharge capacity was 7.0 mAh and the cycle life until the capacity was reduced to 50t was 400 times.

EXAMPLE 30

Production of solid Li ion secondary battery:

In a glove box under an argon atmosphere, a polypropylene-made nonwoven fabric (MU3005, produced by Nippon Byelean) (10 mm×10 mm) having a thickness of about 50 μm was placed on the negative electrode surface of a graphite negative electrode/current collecting body laminate (negative electrode: 10 mm×10 mm; current collecting body: 12 mm×12 mm) prepared in the same manner as in Example 20. Further on the nonwoven fabric surface thereof, a lithium cobaltate positive electrode/current collecting body laminate (positive electrode: 10 mm×10 mm; current collecting body: 12 mm×12 mm) produced in the same manner as in Example 18 was placed to prepare a current collecting body/positive electrode/porous support/negative electrode/current collecting body laminate. The edge parts excluding one edge part of this laminate were sealed with an epoxy resin. Thereafter, a polymerizable monomer-containing material produced in the same manner as in Example 22 was injected from the unsealed edge part under the reduced pressure state (up to 50 mmHg) over 2 minutes and heated at 80° C. for 30 minutes to polymerize the polymerizable monomer-containing material. Then, the unsealed edge part was sealed with an epoxy resin to obtain a graphite/cobalt oxide type solid Li ion secondary battery.

The battery was subjected to repeated charging/discharging at a working voltage of from 2.0 to 4.2 V and a current of 0.1 mA. As a result, the maximum discharge capacity was 6.3 mAh and the cycle life until the capacity was reduced to 50% was 420 times.

EXAMPLE 31

Production of solid Li ion secondary battery:

In a glove box under an argon atmosphere, the periphery of 1 mm from four edges on the negative electrode surface of a graphite negative electrode/current collecting body laminate (negative electrode: 10 mm×10 mm; current collecting body: 12 mm×12 mm) produced in the same manner as in Example 20 was covered with a polyimide film-made spacer of 5 μm. Then, the film for separator after absorption of the electrolytic solution prepared in Example 1 was cut into a size of 10 mm×10 mm and placed as a separator on the graphite negative electrode surface so as to cover the spacer to provide a current collecting body/negative electrode/spacer/separator laminate. On the separator side surface thereof, the positive electrode surface of a lithium cobaltate positive electrode/current collecting body laminate (positive electrode: 10 mm×10 mm; current collecting body: 12 mm×12 mm) prepared in the same manner as in Example 18, was placed to prepare a current collecting body/negative electrode/spacer/separator/positive electrode/current collecting body laminate. The edge parts excluding one edge part of this laminate were sealed with an epoxy resin. Thereafter, a polymerizable monomer-containing material produced in the same manner as in Example 22 was injected from the unsealed edge part under the reduced pressure state (up to 50 mmHg) over 2 minutes and heated at 80° C. for 30 minutes to polymerize the polymerizable monomer-containing material. Then, the unsealed edge part was sealed with an epoxy resin to obtain a graphite/cobalt oxide type solid Li ion secondary battery. FIG. 2 shows a cross section of the battery obtained.

The battery was subjected to repeated charging/discharging at a working voltage of from 2.0 to 4.2 V and a current of 0.1 IMA. As a result, the maximum discharge capacity was 6.7 mAh and the cycle life until the capacity was reduced to 50% was 430 times.

EXAMPLE 32

Production of solid Li ion secondary battery:

In a glove box under an argon atmosphere, the periphery of 1 mm from four edges on the negative surface of a graphite negative electrode/current collecting body laminate (negative electrode: 10 mm×10 mm; current collecting body: 12 mm×12 mm) produced in the same manner as in Example 20 was covered with a polyimide film spacer of 50 μm. Then, the film for separator after absorption of the electrolytic solution prepared in Example 2 was cut into a size of 8 mm×8 mm and placed as a separator inside the spacer on the graphite negative electrode surface. Further on the film and the spacer, the positive electrode surface of a lithium cobaltate positive electrode/current collecting body laminate (positive electrode: 10 mm×10 mm; current collecting body: 12 mm×12 mm) prepared in the same manner as in Example 18, was placed to provide a current collecting body/negative electrode/spacer/separator/positive electrode/current collecting body laminate. The edge parts excluding one edge part of this laminate were sealed with an epoxy resin. Thereafter, a polymerizable monomer-containing material produced in the same manner as in Example 22 was injected from the unsealed edge part under the reduced pressure state (up to 50 mmHg) over 2 minutes and heated at 80° C. for 30 minutes to polymerize the polymerizable monomer-containing material. Then, the unsealed edge part was sealed with an epoxy resin to obtain a graphite/cobalt oxide type solid Li ion secondary battery shown in FIG. 3.

The battery was subjected to repeated charging/discharging at a working voltage of from 2.0 to 4.2 V and a current of 0.1 mA. As a result, the maximum discharge capacity was 5.9 mAh and the cycle life until the capacity was reduced to 50% was 480 times.

EXAMPLE 33

Production of lithium cobaltate positive electrode/separator laminate:

In a glove box under an argon atmosphere, a polymerizable monomer-containing material produced in Example 16 was coated on the positive electrode surface of a lithium cobaltate positive electrode/current collecting laminate produced in the same manner as in Example 18 to have a thickness of 10 μm and irradiated under a mercury lamp for 10 minutes. As a result, a film separator containing a polymer of Compound 3 as a constituent component was formed on the positive electrode surface, thus, a current collecting body/lithium cobaltate positive electrode/separator laminate was prepared.

EXAMPLE 34

Production of graphite negative electrode/separator film laminate:

In a glove box under an argon atmosphere, a polymerizable monomer-containing material produced in the same manner as in Example 16 was coated on the negative electrode surface of a lithium graphite negative electrode/current collecting laminate produced in the same manner as in Example 20 to have a thickness of 10 μm and irradiated under a mercury lamp for 10 minutes. As a result, a film separator containing a polymer of Compound 3 as a constituent component was formed on the negative electrode surface, thus, a current collecting body/graphite negative electrode/separator laminate was prepared.

EXAMPLE 35

Production of solid Li ion secondary battery:

In a glove box under an argon atmosphere, the film for separator after absorption of the electrolytic solution prepared in Example 1 was cut into a size of 10 mm×10 mm and placed as a separator on the negative electrode surface of a graphite negative electrode/current collecting body laminate (negative electrode: 10 mm×10 mm; current collecting body: 12 mm×12 mm) prepared in the same manner as in Example 20, to prepare a current collecting body/negative electrode/separator laminate. On the separator side surface thereof, the separator side surface of a current collecting body/lithium cobaltate positive electrode/separator laminate (positive electrode/separator: 10 mm×10 mm) prepared in Example 33, was placed to prepare a current collecting body/negative electrode/separator/ positive electrode/current collecting body laminate. The edge parts excluding one edge part of this laminate were sealed with an epoxy resin. Thereafter, a polymerizable monomer-containing material produced in the same manner as in Example 22 was injected from the unsealed edge part under the reduced pressure state (up to 50 mmHg) over 2 minutes and heated at 80° C. for 30 minutes to polymerize the polymerizable monomer-containing material. Then, the unsealed edge part was sealed with an epoxy resin to obtain a graphite/cobalt oxide type solid Li ion secondary battery.

The battery was subjected to repeated charging/discharging at a working voltage of from 2.0 to 4.2 V and a current of 0.1 mA. As a result, the maximum discharge capacity was 6.5 mAh and the cycle life until the capacity was reduced to 50% was 410 times.

EXAMPLE 36

Production of solid Li ion secondary battery:

In a glove box under an argon atmosphere, the film for separator after absorption of the electrolytic solution prepared in Example 1 was cut into a size of 10 mm×10 mm and placed as a separator on the separator surface of a current collecting body/graphite negative electrode/separator laminate (negative electrode/separator: 10 mm×10 mm; current collecting body: 12 mm×12 mm) prepared in Example 34, to prepare a current collecting body/negative electrode/separator laminate. On the separator side surface thereof, the positive electrode surface of a current collecting body/lithium cobaltate positive electrode (positive electrode: 10 mm×10 mm; current collecting body 12 mm×12 mm) prepared in the same manner as in Example 18, was placed to prepare a current collecting body/negative electrode/separator/positive electrode/current collecting body laminate. The edge parts excluding one edge part of this laminate were sealed with an epoxy resin. Thereafter, a polymerizable monomer-containing material produced in the same manner as in Example 22 was injected from the unsealed edge part under the reduced pressure state (up to 50 mmHg) over 2 minutes and heated at 80° C. for 30 minutes to polymerize the polymerizable monomer-containing material. Then, the unsealed edge part was sealed with an epoxy resin to obtain a graphite/cobalt oxide type solid Li ion secondary battery.

The battery was subjected to repeated charging/discharging at a working voltage of from 2.0 to 4.2 V and a current of 0.1 mA. As a result, the maximum discharge capacity was 6.5 mAh and the cycle life until the capacity was reduced to 50t was 425 times.

EXAMPLE 37
Production of solid Li ion secondary battery:

In a glove box under an argon atmosphere, the film for separator after absorption of the electrolytic solution prepared in Example 1 was cut into a size of 10 mm×10 mm and placed as a separator on the separator surface of a current collecting body/graphite negative electrode/ separator laminate (negative electrode/separator: 10 mm×10 mm; current collecting body: 12 mm×12 mm) prepared in the same manner as in Example 34, to prepare a current collecting body/negative electrode/separator laminate. On the separator side surface thereof, the separator side surface of a current collecting body/lithium cobaltate positive electrode/separator laminate (positive electrode/separator: 10 mm×10 mm; current collecting body: 12 mm×12 mm) prepared in the same manner as in Example 33, was placed to prepare a current collecting body/negative electrode/separator/positive electrode/current collecting body laminate. The edge parts excluding one edge part of this laminate were sealed with an epoxy resin. Thereafter, a polymerizable monomer-containing material produced in the same manner as in Example 22 was injected from the unsealed edge part under the reduced pressure state (up to 50 mmHg) over 2 minutes and heated at 80° C. for 30 minutes to polymerize the polymerizable monomer-containing material. Then, the unsealed edge part was sealed with an epoxy resin to obtain a graphite/cobalt oxide type solid Li ion secondary battery.

The battery was subjected to repeated charging/ discharging at a working voltage of from 2.0 to 4.2 V and a current of 0.1 mA. As a result, the maximum discharge capacity was 6.0 mAh and the cycle life until the capacity was reduced to 50% was 435 times.

EXAMPLE 38
Production of activated carbon electrode:

To a 9.0:1.0 (by weight) mixture of coconut husk activated carbon and polyvinylidene fluoride, N-methylpyrrolidone was added in an amount of 10 times the weight of the mixture to obtain a gelled composition. On a SUS316 foil (12 mm×12 mm), a polyimide-made spacer frame for molding (thickness: 150 μm) having a width of 1 mm and an inner dimension of 10 mm×10 mm was placed, and the composition obtained above was coated inside the spacer frame to have a thickness of about 150 μm. The molding was then vacuum dried at about 100° C. for 10 hours to obtain an activated carbon electrode (14 mg) adhering to the SUS foil current collecting body.

Before using it in Example 39, the spacer frame was removed and the SUS foil was cut into the same size (10 mm×10 mm) as the activated carbon electrode to provide an activated carbon electrode/current collecting body laminate. In the same manner, a plurality of laminates were prepared.

EXAMPLE 39
Production of solid electrical double-layer capacitor:

Under an argon atmosphere, 0.50 g of Compound 3, 1.00 g of Compound 8, 1.5 g of diethyl carbonate (DEC), 1.5 g of ethylene carbonate (EC), 0.30 g of LiBF4 and 0.01 g of AIBN were well mixed to obtain a polymerizable monomer-containing material.

In a glove box under an argon atmosphere, the polymerizable monomer-containing material obtained above was impregnated into and coated on each of two sheets of current collecting body/activated carbon electrode laminate (14 mg) (10 mm×10 mm) prepared in Example 38 to prepare two electrode/current collecting body laminates. The film for separator after absorption of the electrolytic solution prepared in Example 1 was cut into a size of 10 mm×10 mm and placed as a separator on the electrode side surface of one electrode/current collecting body laminate to provide a current collecting body/electrode/ separator laminate. On the separator side surface thereof, the electrode side surface of another electrode/current collecting body laminate was placed to prepare a current collecting body/electrode/separator/electrode/current collecting body laminate. The laminate was heated at 100° C. for 1 hour and the edge parts of the laminate were sealed with epoxy resin to produce a solid electrical double-layer capacitor as shown in FIG. 4.

The capacitor was subjected to charging/discharging at a working voltage of from 0 to 2.0 V and a current of 0.1 mA. As a result, the maximum capacity was 480 mF. Further, even after 50 times repetition of charging/discharging under the above-described conditions, the capacity was scarcely changed.

EXAMPLE 40
Production of solid electrical double-layer capacitor:

A solid electrical double-layer capacitor as shown in FIG. 4 was produced in the same manner as in Example 39 except for using a Compound 3 polymer/polyethylene-net composite film impregnated with an electrolytic solution, produced in Example 15 as a separator.

The capacitor was subjected to charging/discharging at a working voltage of from 0 to 2.0 V and a current of 0.1 mA. As a result, the maximum capacity was 450 mF. Further, even after 50 times repetition of charging/discharging under the above-described conditions, the capacity was scarcely changed.

EXAMPLE 41

Under an argon atmosphere, 1.50 g of Compound 3, 1.5 g of diethyl carbonate (DEC), 1.5 g of ethylene carbonate (EC), 0.30 g of LiBF$_4$ and 0.02 g of Irgacure 651 were well mixed to obtain a polymerizable monomer-containing material.

To the resulting polymerizable monomer-containing material was added 0.24 g of Aluminum Oxide C (trade name, produced by Nippon Aerosil Co., Ltd., specific surface area: about 100 m$^2$/g) as a granular support under an argon atmosphere and the resulting mixture was well stirred to obtain an opaque white solution. The opaque white solution was coated on a 10 cm-square-size PET film under an argon atmosphere and irradiated under a mercury lamp for 10 minutes. As a result, a white turbid free-standing composite film of Compound 3 polymer/aluminum oxide impregnated with an electrolytic solution and having a thickness of about 30 μm was obtained on the PET film. The ion conductivities of the film at 25° C. and −20° C. were measured by an impedance method and determined to be $3.0 \times 10^{-3}$ S/cm and $1.0 \times 10^{-3}$ S/cm, respectively, thus showing an increase in conductivity as compared with the case in which no granular support was added. The film exhibited a tensile strength of 23 kg/cm$^2$ and a modulus of elasticity of more than $10^8$ dyn/cm$^2$.

EXAMPLE 42

A transparent free-standing composite film of Compound 3 polymer/silica impregnated with an electrolytic solution and having a thickness of about 30 μm was obtained in the same manner as in Example 41 except for using the same amount of silica fine particles (Aerosil RX200: trade name, produced by Nippon Aerosil Co., Ltd., specific surface area: 140 m$^2$/g) in place of Aluminum Oxide C used in Example 41. The ion conductivities of the films at 25° C. and −20° C. were measured by an impedance method and determined to be $3.5 \times 10^{-3}$ S/cm and $1.2 \times 10^{-3}$ S/cm, respectively, thus showing an increase in conductivity as compared with the case in which no granular support was added. The film exhibited a tensile strength of 19 kg/cm$^2$ and a modulus of elasticity of more than 108 dyn/cm$^2$.

EXAMPLE 43

Under an argon atmosphere, 1.50 g of Compound 3, 1.5 g of diethyl carbonate (DEC), 1.5 g of ethylene carbonate (EC), 0.30 g of LiBF$_4$ and 0.02 g of Irgacure 651 were well mixed to obtain a polymerizable monomer-containing material.

To the resulting polymerizable monomer-containing material was added 0.05 g of polymer beads for liquid crystal spacer (Micropearl SP-213: trade name, produced by Sekisui Fine Chemical Co., Ltd., divinyl-benzene copolymer particle diameter: 13.00±0.10 μm) as a granular support under an argon atmosphere and the resulting mixture was well stirred to obtain a polymerizable monomer-containing material containing polymer beads. The polymerizable monomer-containing material was coated on a 10 cm-square-size PET film under an argon atmosphere and irradiated under a mercury lamp for 10 minutes. As a result, a transparent free-standing composite film of Compound 3 polymer/polymer beads SP-213 impregnated with an electrolytic solution and having a thickness of about 15 μm±2 μm was obtained on the PET film. The ion conductivities of the film at 25° C. and −20° C. were measured by an impedance method and determined to be $2.5 \times 10^{-3}$ S/cm and $0.8 \times 10^{-3}$ S/cm, respectively. The film exhibited a tensile strength of 14 kg/cm$^2$ and a modulus of elasticity of more than $10^8$ dyn/cm$^2$.

EXAMPLE 44

A transparent free-standing composite film of Compound 3 polymer/alumina impregnated with an electrolytic solution and having a thickness of 23 μm±3 μm was obtained in the same manner as in Example 43 except for using the same amount of rod-form alumina for liquid crystal spacer (Alfit FT-20: trade name, produced by Showa Denko K.K., diameter: 20±0.5 μm, average length: about 30 μm) in place of the polymer beads used in Example 43. The ion conductivities of the films at 25° C. and −20° C. were measured by an impedance method and determined to be $2.2 \times 10^{-3}$ S/cm and $0.6 \times 10^{-3}$ S/cm, respectively. The film exhibited a tensile strength of 23 kg/cm$^2$ and a modulus of elasticity of more than $10^8$ dyn/cm$^2$.

EXAMPLE 45

Production of solid Li ion secondary battery:

A graphite/lithium cobaltate type solid Li ion secondary battery was obtained in the same manner as in Example 24 except for using a Compound 3 polymer/Aluminum Oxide C-made composite film impregnated with an electrolytic solution, produced in Example 41 as a separator.

The resulting battery was subjected to repeated charging/discharging at a working voltage of from 2.0 to 4.2 V and a current of 0.1 mA. As a result, the maximum discharge capacity was 7.3 mAh and the cycle life until the capacity was reduced to 50% was 450 times.

EXAMPLE 46

Production of Li ion secondary battery:

A graphite/lithium cobaltate type Li ion secondary battery was obtained in the same manner as in Example 21 except for using a Compound 3 polymer/Aluminum Oxide C-made composite film impregnated with an electrolytic solution, produced in Example 41 as a separator.

The resulting battery was subjected to repeated charging/discharging at a working voltage of from 2.0 to 4.2 V and a current of 0.5 mA. As a result, the maximum discharge capacity was 7.3 mAh and the cycle life until the capacity was reduced to 50% was 330 times.

EXAMPLE 47

Production of Li ion secondary battery:

A graphite/lithium cobaltate type Li ion secondary battery was obtained in the same manner as in Example 21 except for using a Compound 3 polymer/polymer beads-made composite film impregnated with an electrolytic solution, produced in Example 43 as a separator.

The resulting battery was subjected to repeated charging/discharging at a working voltage of from 2.0 to 4.2 V and a current of 0.5 mA. As a result, the maximum discharge capacity was 7.3 mAh and the cycle life until the Ad capacity was reduced to 50t was 380 times.

EXAMPLE 48

Production of Li ion secondary battery:

In a glove box under an argon atmosphere, a graphite negative electrode (10 mm×10 mm) produced in the same manner as in Example 20 was impregnated with an electrolytic solution (1.5 mol/λ of LiBF$_4$/EC+DEC (weight ratio: 1:1)) and coated thereon with the polymerizable monomer-containing material containing polymer beads prepared in Example 43 to a thickness of about 15 μm using a coater. By irradiation under a mercury lamp for 10 minutes for polymerization, the Compound 3 polymer/polymer beads-made composite film was formed on the graphite negative electrode as a transparent free-standing film having a thickness of about 15 μm. Further, on the Compound 3. polymer/polymer beads-made composite film was laminated a lithium cobaltate positive electrode (10 mm×10 mm) prepared in the same manner as in Example 18 and impregnated with an electrolytic solution (1.5 mol/λ of LiBF$_4$/EC+DEC (weight ratio: 1:1)), and the edge parts of this laminate were sealed with an epoxy resin to obtain a lithium/cobalt oxide type Li ion secondary battery as shown in FIG. 1.

The battery was subjected to repeated charging/discharging at a working voltage of from 2.0 to 4.2 V and a current of 0.5 mA. As a result, the maximum discharge capacity was 7.3 mAh and the cycle life until the capacity was reduced to 50% was 430 times.

EXAMPLE 49

Production of Li ion secondary battery:

A graphite/lithium cobaltate type Li ion secondary battery was obtained in the same manner as in Example 21 except for using a Compound 3 polymer/alumina-made composite film impregnated with an electrolytic solution, produced in Example 44 as a separator.

The resulting battery was subjected to repeated charging/discharging at a working voltage of from 2.0 to 4.2 V and a current of 0.5 mA. As a result, the maximum discharge capacity was 7.0 mAh and the cycle life until the capacity was reduced to 50% was 360 times.

EXAMPLE 50

Production of Li ion secondary battery:

In a glove box under an argon atmosphere, a graphite negative electrode (10 mm×10 mm) produced in the same manner as in Example 20 was impregnated with an electrolytic solution (1.5 mol/λ of $LiBF_4$/EC+DEC (weight ratio: 1:1)) and coated thereon with the polymerizable monomer-containing material containing alumina prepared in Example 44 to a thickness of about 20 μm using a coater. By irradiation under a mercury lamp for 10 minutes for polymerization, the Compound 3 polymer/alumina-made composite film was formed on the graphite negative electrode as a transparent free-standing film having a thickness of about 23 μm. Further, on the Compound 3 polymer/alumina-made composite film was laminated a lithium cobaltate positive electrode (10 mm×10 mm) prepared in the same manner as in Example 18 and impregnated with an electrolytic solution (1.5 mol/λ of $LiBF_4$/EC+DEC (weight ratio: 1:1)), and the edge parts of this laminate were sealed with an epoxy resin to obtain a lithium/cobalt oxide type Li ion secondary battery as shown in FIG. 1.

The battery was subjected to repeated charging/discharging at a working voltage of from 2.0 to 4.2 V and a current of 0.5 mA. As a result, the maximum discharge capacity was 7.1 mAh and the cycle life until the capacity was reduced to 500 was 410 times.

EXAMPLE 51

Under an argon atmosphere, 1.50 g of Compound 3, 1.5 g of diethyl carbonate (DEC), 1.5 g of ethylene carbonate (EC), 0.30 g of $LiBF_4$ and 0.05 g of bis(4-t-butylcyclohexyl) peroxy dicarbonate ("Pahroiru TCP") (trade name, produced by Nippon Fats and Oil Co., Ltd.) were well mixed to obtain a polymerizable monomer-containing material. To the resulting polymerizable monomer-containing material was added 0.05 g of polymer beads for liquid crystal spacer (Micropearl SP-213: trade name, produced by Sekisui Fine Chemical Co., Ltd., particle diameter: 13.00±0.10 μm) as a granular support under an argon atmosphere and the resulting mixture was well stirred to obtain a polymerizable monomer-containing material containing polymer beads.

In a glove box under an argon atmosphere, a graphite negative electrode (20 mm×20 mm) produced in the same manner as in Example 20 was impregnated with an electrolytic solution (1.5 mol/λ of $LiBF_4$/EC+DEC (weight ratio: 1:1)) and a polyimide-made frame having a width of 1 mm (thickness: about 20 μm) was placed on each of four edges, which then was laminated a lithium cobaltate positive electrode (20 mm×20 mm) prepared in the same manner as in Example 18 impregnated with an electrolytic solution (1.5 mol/λ of $LiBF_4$/EC+DEC (weight ratio: 1:1)). Then, the polymerizable monomer-containing material containing polymer beads was injected into the space between the positive and negative electrodes and polymerized by heating at 70° C. for 30 minutes to produce a graphite negative electrode/Compound 3 polymer/polymer beads-made composite film impregnated with an electrolytic solution/lithium cobaltate positive electrode laminate battery. The edge parts of this laminate were sealed with an epoxy resin to obtain a graphite/lithium cobaltate type Li ion secondary battery as shown in FIG. 1.

The battery was subjected to repeated charging/discharging at a working voltage of from 2.0 to 4.2 V and a current of 2 mA (0.5 $mA/cm^2$). As a result, the maximum discharge capacity was 28 mAh and the cycle life until the capacity was reduced to 50% was 320 times.

EXAMPLE 52

Production of solid electrical double-layer capacitor:

A solid electrical double-layer capacitor was produced in the same manner as in Example 39 except for using a Compound 3 polymer/aluminum oxide composite film impregnated with an electrolytic solution, produced in Example 41 as a separator.

The capacitor was subjected to charging/discharging at a working voltage of from 0 to 2.0 V and a current of 0.1 mA. As a result, the maximum capacity was 480 mF. Further, even after 50 times repetition of charging/discharging under the above-described conditions, the capacity was scarcely changed.

EXAMPLE 53

Under an argon atmosphere, 1.50 g of Compound 3, 4.5 g of diethyl carbonate (DEC), 4.5 g of ethylene carbonate (EC), 0.30 g of $LiBF_4$ and 0.02 g of Darocur 1173 (trade name, UV polymerization initiator manufactured by Ciba-Geigy, Japan were well mixed to obtain a polymerizable monomer-containing material.

The resulting polymerizable monomer-containing material was coated on a 10 cm-square-size PET film under an argon atmosphere and irradiated under a mercury lamp for 10 minutes. As a result, a transparent free-standing film containing as a constituent component a polymer of Compound 3 impregnated with an electrolytic solution and having a thickness of about 50 μm was obtained on the PET film. The ion conductivity of the film at 25° C. was measured by an impedance method and determined to be $6×10^{-3}$ S/cm. The film exhibited a tensile strength of 7 $kg/cm^2$ and a modulus of elasticity of more than $10^7$ $dyn/cm^2$.

EXAMPLE 54

Under an argon atmosphere, 150 g of Compound 3, 4.5 g of diethyl carbonate (DEC), 4.5 g of ethylene carbonate (EC), 0.30 g of $LiBF_4$ and 0.02 g of Irgacure 651 were well mixed to obtain a polymerizable monomer-containing material.

To the resulting polymerizable monomer-containing material was added 0.24 g of Aluminum Oxide C (trade name, produced by Nippon Aerosil Co., Ltd., specific surface area: about 100 $m^2/g$) as a granular support under an argon atmosphere and the resulting mixture was well stirred to obtain an opaque white solution. The opaque white solution was coated on a 10 cm-square-size PET film under an argon atmosphere and irradiated under a mercury lamp for 10 minutes. As a result, a white turbid free-standing composite film of Compound 3 polymer/aluminum oxide impregnated with an electrolytic solution and having a thickness of about 30 μm was obtained on the PET film. The ion conductivities of the film at 25° C. and −20° C. were measured by an impedance method and determined to be $6.5 \times 10^{-3}$ S/cm and $2.0 \times 10^{-3}$ S/cm, respectively, thus showing an increase in conductivity as compared with the case in which no granular support was added. The film exhibited a tensile strength of 10 kg/cm$^2$ and a modulus of elasticity of more than $10^8$ dyn/cm$^2$.

INDUSTRIAL APPLICABILITY

The film for separator of the present invention contains a cross-linked polymer having an oxyalkylene group or a cross-linked polymer having an oxyalkylene group bonded through a urethane bond, as a constituent component and thereby, gains properties such that the film strength is good, the processability is excellent, the absorption of electrolytic solution is large, and as a result, the ion conductivity is high.

Further, according to the production method of a film for separator of the present invention, the film for separator of the present invention can be efficiently produced and in particular, a film for thin separator having excellent film strength and high ion conductivity can be produced.

The electrochemical apparatuses using the film for separator of the present invention as a separator, such as a battery and an electrical double-layer capacitor, is advantageous in that they can work at a high capacity and a high current because the separator has the above-described property.

In particular, a battery or a capacitor using the film for separator of the present invention as a separator and further a solid polymer electrolyte is free of the fear of leakage of the solution because the ion conductive material is solid, and as a result, they can be used stably for a long period of time. Further, by using the separator and the solid polymer electrolyte, thin batteries or capacitors can be produced.

The battery and the production method thereof of the present invention provide a whole solid type battery capable of working at a high capacity and a high current, having a long cycle life, and excellent in the safety and the reliability. The battery can be used as a power source for electrical goods including a power source for portable equipment and a backup power source, or as a large-scale power source for electric automobiles or for load leveling. Further, by using the separator of the present invention having the above-described properties, the battery can be reduced in the thickness and even if reduced in the thickness, no problem is caused in the strength or long-term use. Therefore, batteries capable of free shaping, for example, into a paper battery such as identification card, or a flexible battery can be advantageously obtained.

Furthermore, the electrical double-layer capacitor and the production method thereof of the present invention provide an electrical double-layer capacitor capable of working at a high voltage, a high capacity and a high current even when compared to conventional whole solid type capacitors, and having good cyclability and excellent safety and reliability. And, a whole solid electrical double-layer capacitor having the above-described property can be produced. Accordingly, the capacitor of the present invention can be used not only as a backup power source but also, by using in combination with a miniature battery, as a power source for various electrical goods. Further, by using the separator of the present invention having the above-described properties, the capacitor can have good processability such as reduction in the thickness and therefore, the application thereof is expected to expand over the conventional use as a solid type electrical double-layer capacitor.

What is claimed is:

1. A film for a separator of an electrochemical apparatus comprising, as a constituent component, an acryloyl-based cross-linked or an alkyl-substituted acryloyl-based cross-linked polymer having an oxyalkylene group, said film having been formed by electromagnetic wave polymerization and said film having a uniform film thickness of from 1 to 30 μm with a fluctuation of film thickness of within ±10%, an ion conductivity greater than $1 \times 10^{-4}$ S/cm and a film strength sufficient to be a free-standing film.

2. A film for a separator of an electrochemical apparatus comprising, as a constituent component, an acryloyl-based cross-linked polymer having a urethane bond and an oxyalkylene group, said film having a uniform film thickness of from 1 to 30 μm with a fluctuation of film thickness of within ±10% and an ion conductivity greater than $1 \times 10^{-4}$ S/cm.

3. A film for a separator of an electrochemical apparatus as claimed in claim 1 or 2, wherein said polymer is a polymer of an acryloyl-based or methacryloyl-based compound having a structure containing a unit represented by formula (1) and/or a copolymer comprising said compound as a copolymer component:

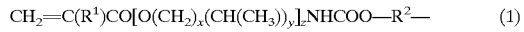

$$CH_2=C(R^1)CO[O(CH_2)_x(CH(CH_3))_y]_zNHCOO-R^2- \qquad (1)$$

wherein R$^1$ represents hydrogen or an alkyl group; R$^2$ represents a divalent organic group containing an oxyalkylene group and said organic group may be linear, branched or cyclic, or may contain one or more elements other than carbon, hydrogen and oxygen; x and y each represents 0 or an integer of from 1 to 5 and z represents a numerical value of from 1 to 10, provided that when x=0 and y=0, z=0; and the moiety (CH$_2$) and the moiety (CH(CH$_3$)) may be configured irregularly; provided that when the unit represented by formula (1) is present in plurality in the same molecule, the R$^1$ or R$^2$ groups or the values represented by x, y or z are independent from each other and need not be the same.

4. A film for a separator of an electrochemical apparatus as claimed in claim 1 or 2, wherein said polymer is a polymer of an acryloyl-based or methacryloyl-based compound having a structure containing a unit represented by formula (2) and/or a copolymer comprising said compound as a copolymer component:

$$CH_2=C(R^1)CO[O(CH_2)_x(CH\ (CH_3))_y]_zNHCOO(R^3O)_n- \qquad (2)$$

wherein R$^1$ represents hydrogen or an alkyl group, R$^3$ represents —(CH$_2$)$_2$— or —CH(CH$_3$)CH$_2$—, n represents an integer of 1 or greater, and x, y and z each has the same meaning as defined in formula (1).

5. A film for a separator of an electrochemical apparatus as claimed in claims 1 or 2, wherein said film contains an electrolyte and/or a solvent.

6. A film for a separator of an electrochemical apparatus as claimed in claim 5, wherein at least one of the electrolyte is an alkali metal salt, a quaternary ammonium salt or a quaternary phosphonium salt.

7. A film for a separator of an electrochemical apparatus as claimed in claim 5, wherein said solvent is a carbonate-base compound.

8. A film for a separator of an electrochemical apparatus as claimed in claims 1 or 2, wherein said film is a film having a support.

9. A film for a separator of an electrochemical apparatus as claimed in claims 1 or 2, wherein said film is a film having a porous support.

10. A film for a separator of an electrochemical apparatus as claimed in claim 8, wherein said support is a granular support.

11. A film for a separator of an electrochemical apparatus as claimed in claim 8, wherein said support is an agglomerate of primary particles.

12. A film for a separator of an electrochemical apparatus as claimed in claim 8, wherein said support has a BET specific surface area of not smaller than 10 m²/g.

13. A separator of an electrochemical apparatus comprising a film claimed in claim 8.

14. A separator of an electrochemical apparatus as claimed in claim 13, wherein said separator is a separator compounded with a support.

15. A separator of an electrochemical apparatus as claimed in claim 13, wherein said separator contains a solvent and an electrolyte in the total amount of 100 to 1,000% based on the total weight of said separator.

16. A battery using the film described in claims 1 or 2 as a separator.

17. A battery as claimed in claim 16, wherein the negative electrode of the battery comprises an electrode containing lithium, a lithium alloy or a material capable of occluding and releasing lithium ions.

18. A method for producing a battery using the film of claims 1 or 2, comprising laminating a positive electrode, a separator comprising the film described in claims 1 or 2 and a negative electrode in any order to form a positive electrode/separator/negative electrode laminate with the separator being interposed between the positive electrode and the negative electrode as a battery-constituting structure, filling the battery-constituting structure with a polymerizable monomer-containing material containing, as essential constituent components, at least one electrolyte and at least one acryloyl-based or methacryloyl-based compound having a structure containing a unit represented by formula (1) or (2):

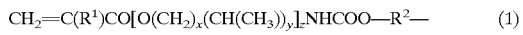

wherein R¹ represents hydrogen or an alkyl group; R² represents a divalent organic group containing an oxyalkylene group and said organic group may be linear, branched or cyclic, or may contain one or more elements other than, carbon, hydrogen and oxygen: x and y each represents 0 or an integer of from 1 to 5 and z represents a numerical value of from 1 to 10, provided that when x=0 and y=0, z=0; and the moiety (CH₂) and the moiety (CH(CH₃)) may be configured irregularly; provided that when the unit represented by formula (1) is present in plurality in the same molecule, the R¹ or R² groups or the values represented by x, y or z are independent from each other and need not be the same;

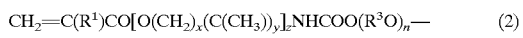

wherein R¹ represents hydrogen or an alkyl group, R¹ represents —(CH₂)₂— or —CH(CHA)CH₂—, n represents an integer of 1 or greater, and x, y and z which has the same meaning as defined in formula (1), and polymerizing said polymerizable monomer-containing material.

19. A method for producing a battery using the film of claims 1 or 2, comprising forming a positive electrode/separator laminate and/or a negative electrode/separator laminate by laminating a separator comprising a film described in claims 1 or 2 on at least one of a positive electrode and a negative electrode, using the positive electrode/separator laminate and/or the negative electrode/separator laminate to form a positive electrode/separator/negative electrode laminate with the separator being interposed between the positive electrode and the negative electrode as a battery-constituting structure and filling the battery-constituting structure with a liquid material containing at least one electrolyte as an essential constituent component.

20. A method for producing a battery using the film of claims 1 or 2, comprising forming a positive electrode/separator laminate and/or a negative electrode/separator laminate by laminating a separator comprising a film described in claims 1 or 2 on at least one of a positive electrode and a negative electrode, using the positive electrode/separator laminate and/or the negative electrode/separator laminate to form a positive electrode/separator/negative electrode laminate with the separator being interposed between the positive electrode and the negative electrode as a battery-constituting structure and filling the battery-constituting structure with a polymerizable monomer-containing material containing, as essential constituent components, at least one electrolyte and at least one acryloyl-based or methacryloyl-based compound having a structure containing a unit represented by formula (1) or (2):

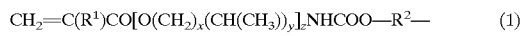

wherein R¹ represents hydrogen or an alkyl group: R² represents a divalent organic group containing an oxyalkylene group and said organic group may be linear, branched or cyclic or may contain one or more elements other than carbon, hydrogen and oxygen; x and y each represents 0 or an integer of from 1 to 5 and z represents a numerical value of from 1 to 10, provided that when x=0 and y=0 z=0; and the moiety (CH₂) and the moiety (CH(CH₃)) may be configured irregularly; provided that when the unit represented by formula (1) is present in plurality in the same molecule, the R¹ or R² groups or the values represented by x, y or z sire independent from each other and need not be the same;

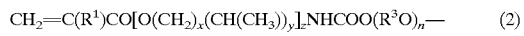

wherein R¹ represents hydrogen or an alkyl group, R³ represents —(CH₂)₂— or —CH(CH₃)CH₂—, n represents an integer of 1 or greater, and x, y and z each has the same meaning as defined in formula (1), and polymerizing said polymerizable monomer-containing material.

21. A method for producing a battery using the film of claims 1 or 2, having a separator comprising the film described in claims 1 or 2, which comprises forming a positive electrode/porous support/negative electrode laminate with the porous support being interposed between the positive electrode and the negative electrode as a battery-constituting structure using a positive electrode/porous support laminate and/or a negative electrode/porous support laminate obtained by, laminating a porous support on at least one of the positive electrode said the negative electrode, filling the battery-constituting structure with a polymerizable monomer-containing material containing, as essential constituent components, at least one electrolyte and at least one acryloyl-based or methacryloyl based compound having a structure containing a unit represented by formula (1) or (2):

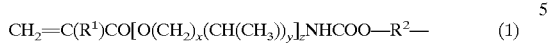

wherein R¹ represents hydrogen or an alkyl group; R² represents a divalent organic grout containing an oxyalkylene group and said organic group may be linear, branched or cyclic, or may contain one or more elements other than carbon, hydrogen and oxygen: x and v each represents 0 or an integer of from 1 to 5 and z represents a numerical value of from 1 to 10, provided that when x=0 and y=0, z=0; and the moiety (CH$_2$) and the moiety (CH(CH$_3$)) may be configured irregularly; provided that when the unit represented by formula (1) is present in plurality in the same molecule, the R¹ or R² groups or the values represented by x, y or z are independent from each other and need not be the same;

wherein R¹ represents hydrogen or an alkyl group, R³ represents —(CH$_2$)$_2$— or —CH(CH$_3$)CH$_2$—, n represents an integer of 1 or greater, and x, y and z each has the same meaning as defined in formula (1), and polymerizing said polymerizable monomer-containing material.

22. A method for producing a battery using the film of claims 1 or 2, comprising impregnating and/or coating at least one of a positive electrode and a negative electrode with a polymerizable monomer-containing material containing, as a constituent component, at least one acryloyl-based or methacryloyl-based compound having a structure containing a unit represented by formula (1) or (2):

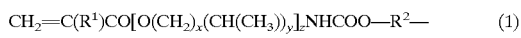

wherein R¹ represents hydrogen or an alkyl group: R² represents a divalent organic group contain an oxyalkylene group and said organic group may be linear, branched or cyclic, or may contain one or more elements other than carbon, hydrogen and oxygen; x and y each represents 0 or an integer of from 1 to 5 and z represents a numerical value of from 1 to 10, provided that when x=0 and v=0, z=0; and the moiety (CH$_2$) and the moiety (CH(CH$_3$)) may be configured irregularly; provided that when the unit represented by formula (1) is present in plurality in the same molecule, the R¹ or R² groups or the values represented by x, y or z are independent from each other and need not be the same;

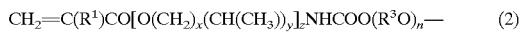

wherein R¹ represents hydrogen or an alkyl group, R³ represents —(CH$_2$)$_2$— or —CH(CH$_3$)CH$_2$—, n represents an integer of 1 or greater, and x, y and z each has the same meaning as defined in formula (1);

forming a positive electrode/separator/negative electrode laminate with the separator being interposed between the positive electrode and the negative electrode as a battery-constituting structure using a positive electrode, a negative electrode and a separator comprising a film described in claims 1 or 2, and polymerizing said polymerizable monomer-containing material.

23. A method for producing a battery as claimed in claim 22, wherein said polymerizable monomer-containing material is a polymerizable monomer-containing material containing, as essential constituent components, at least, one electrolyte and at least one acryloyl-based or methacryloyl-based compound having a structure containing a unit represented by formula (1) or (2):

wherein R¹ represents hydrogen or an alkyl group; R² represents a divalent organic group containing an oxyalkylene group and said organic group may be linear, branched or cyclic, or may contain one or more elements other than carbon, hydrogen and oxygen: x and v each represents 0 or an integer of from 1 to 5 and z represents a numerical value of from 1 to 10, provided that when x=0 and y=0, z=0; and the moiety (CH$_2$) and the moiety (CH(CH$_3$)) may be configured irregularly; provided that when the unit represented by formula (1) is present in plurality in the same molecule, the R¹ or R² groups or the values represented by x, y or z are independent from each other and need not be the same,

wherein R¹ represents hydrogen or an alkyl group, R³ represents —(CH$_2$)$_2$— or —CH(CH$_3$)CH$_2$—, n represents an integer of 1 or greater, and x, y and z each has the same meaning as defined in formula (1).

24. A film for a separator of an electrochemical apparatus as claimed in claim 9, wherein said support is a granular support.

25. A film for a separator of an electrochemical apparatus as claimed in claim 9, wherein said support is an agglomerate of primary particles.

26. A film for a separator of an electrochemical apparatus as claimed in claim 9, wherein said support has a BET specific surface area of not smaller than 10 m²/g.

27. A film for a separator of an electrochemical apparatus as claimed in claim 1 or 2, wherein said tensile strength is more than 3 kg/cm² and a modulus of elasticity is more than 10⁶ dyn/cm².

* * * * *